(12) United States Patent
Gordon et al.

(10) Patent No.: US 7,900,589 B2
(45) Date of Patent: Mar. 8, 2011

(54) HIGH EFFICIENCY WATER HEATER

(75) Inventors: Michael Gordon, East Grand Rapids, MI (US); Ross Campbell, Middleville, MI (US)

(73) Assignee: Bradford White Corporation, Ambler, PA (US)

( * ) Notice: Subject to any disclaimer, the term of this patent is extended or adjusted under 35 U.S.C. 154(b) by 476 days.

(21) Appl. No.: 12/121,154

(22) Filed: May 15, 2008

(65) Prior Publication Data

US 2008/0216772 A1    Sep. 11, 2008

Related U.S. Application Data

(62) Division of application No. 10/374,605, filed on Feb. 26, 2003, now Pat. No. 7,559,293.

(60) Provisional application No. 60/385,595, filed on Jun. 4, 2002.

(51) Int. Cl.
*F22B 7/12* (2006.01)

(52) U.S. Cl. ............... 122/18.31; 122/155.1; 122/182.2; 220/694.1

(58) Field of Classification Search ............... 122/13.01, 122/18.3, 18.31, 18.1, 135.1, 155.1, 182.1, 122/182.2; 220/592.1, 592.23, 592.24, 694, 220/694.1
See application file for complete search history.

(56) References Cited

U.S. PATENT DOCUMENTS

| | | | |
|---|---|---|---|
| 3,444,855 A | 5/1969 | Priest et al. | |
| 4,329,943 A | 5/1982 | Schworer | |
| 4,492,185 A | 1/1985 | Kendall et al. | |
| 4,541,410 A | 9/1985 | Jatana | |
| 4,846,150 A * | 7/1989 | Maton | 122/18.2 |
| 4,875,465 A | 10/1989 | Kramer | |
| 4,889,105 A | 12/1989 | Vago et al. | |
| 4,899,696 A * | 2/1990 | Kennedy et al. | 122/135.1 |
| 5,027,749 A | 7/1991 | Cifaldi | |
| 5,197,415 A * | 3/1993 | Stretch et al. | 122/14.22 |
| 5,279,261 A | 1/1994 | Moscone | |
| 5,314,009 A | 5/1994 | Yates et al. | |

(Continued)

FOREIGN PATENT DOCUMENTS

DE    39 14 746 A1    11/1989

(Continued)

OTHER PUBLICATIONS

European Search Report dated Aug. 30, 2004, for corresponding EP Application No. EP 03 253 535.

*Primary Examiner* — Gregory A Wilson
(74) *Attorney, Agent, or Firm* — RatnerPrestia

(57) ABSTRACT

A collector assembly is provided for directing products of combustion between segments of a flue of a water heater. The assembly includes an insulator at least partially defining a chamber configured to direct products of combustion between the flue segments. The assembly also includes a cover configured to at least partially surround the insulator. The cover is also configured to be coupled to a water tank of the water heater. The insulator in an uncompressed state is dimensioned to extend outwardly from the cover when the insulator is positioned in the cover. The insulator in a compressed state is dimensioned to permit coupling of the cover to the water tank.

20 Claims, 19 Drawing Sheets

U.S. PATENT DOCUMENTS

| | | | |
|---|---|---|---|
| 5,687,678 A | 11/1997 | Suchomel et al. | |
| 5,699,756 A * | 12/1997 | Ross et al. | 122/18.3 |
| 6,286,465 B1 | 9/2001 | Hughes et al. | |
| 6,619,951 B2 | 9/2003 | Bodnar et al. | |
| 6,634,320 B2 | 10/2003 | Grando et al. | |
| 7,290,503 B2 * | 11/2007 | Missoum et al. | 122/18.1 |
| 2001/0027756 A1 | 10/2001 | Vago | |

FOREIGN PATENT DOCUMENTS

| | | |
|---|---|---|
| EP | 0 616 173 A2 | 9/1994 |
| EP | 0 915 304 A2 | 5/1999 |
| EP | 1 004 833 A2 | 5/2000 |
| EP | 1 008 819 A2 | 6/2000 |
| TW | 259 217 | 10/1995 |

* cited by examiner

HIGH EFFICIENCY WATER HEATER

CROSS REFERENCE TO RELATED APPLICATIONS

This application is a divisional of U.S. Nonprovisional application Ser. No. 10/374,605 filed on Feb. 26, 2003 and which is related to and claims the benefit of U.S. Provisional Application No. 60/385,595 filed on Jun. 4, 2002, the contents of each of which are incorporated herein by reference.

FIELD OF THE INVENTION

The present invention relates to a high efficiency water heater and, more particularly, to a commercial water heater having improved heat exchange performance.

BACKGROUND OF THE INVENTION

Commercial and residential water heaters typically heat water by generating tens of thousands, and even hundreds of thousands, of BTUs. For many years, manufacturers of water heaters, and especially manufacturers of water heaters to be used in commercial applications, have sought to increase the efficiency of the exchange of this heat energy from burned fuel to the water contained in the water heater. Accordingly, maximized heat exchange efficiency has long been an object of commercial and residential water heater manufactures.

As heat exchange efficiency increases, however, such increased efficiency gives rise to the problems associated with condensation of water vapor from the products of combustion. More specifically, upon burning of a mixture of fuel and air, water is formed as a constituent of the products of combustion. It is recognized that as the temperatures of the combustion gases decrease as the result of successful exchange of heat from the combustion gases to water in the water heater, the water vapor within the combustion gases tends to be condensed in greater quantities. In other words, as the temperatures of the combustion gases decrease as a direct result of increasingly efficient exchange of heat energy to the circulated water, the amount of condensate forming on the heat exchange surfaces also increases. This condensate is typically found to increase when heat exchange efficiencies exceeding about 90% are achieved.

Such condensate is typically acidic, with pH values often in the range of between about 2 to 5. The formation of increased amounts of such acidic condensate, even in relatively small quantities, can accelerate the corrosion of heat exchange tubing, increase oxidation and scale formation, reduce heat exchange efficiency and contribute to failure of the water heater.

Commercial and residential water heaters can be designed to operate below the efficiencies at which increased quantities of condensate are likely to form (i.e., below the condensing mode) so that acidic products of combustion are discharged in vapor form in higher temperature exhaust gas. To do so, however, compromises the efficiency of the water heater.

Accordingly, there continues to be a need for a water heater having improved heat exchange efficiency yet resisting the effects of water vapor condensation associated with such efficiency.

SUMMARY OF THE INVENTION

In one exemplary embodiment, this invention provides a water heater having improved heat exchange efficiency. The water heater includes a water tank and a flue system positioned to extend at least partially through an interior of the water tank. The water tank and the flue system are positioned to transfer heat from combustion products within the flue system to water in the water tank. The flue system includes an upstream heat exchange portion having at least one substantially vertical flue tube, and a downstream heat exchange portion having at least one substantially vertical flue tube. The upstream heat exchange portion of the flue system provides a first pass for heat exchange with water in the water tank. The downstream heat exchange portion provides a second pass for heat exchange with water in the water tank.

In another exemplary embodiment, a water heater having improved heat exchange efficiency is provided. The water heater includes a blower configured to receive fuel and air. The blower is oriented to deliver the fuel and air along a substantially vertical axis. The water heater also includes a burner positioned downstream from the blower along the axis to receive the fuel and air. The burner is configured to deliver the products of combustion of the fuel and air along the axis. The water heater also includes a flue tube having a segment extending along the axis. The flue tube is positioned to receive the products of combustion from the burner, and the flue tube provides a first pass for heat exchange with water in the water heater.

In yet another exemplary embodiment, a system for exhausting combustion products and draining condensate from a flue system of a water heater is provided. The system includes a receptacle positioned to collect combustion products and condensate from the flue system. The receptacle defines an orifice positioned to exhaust combustion products from within the receptacle. The receptacle also defines an outlet positioned to drain condensate from the receptacle.

In still another exemplary embodiment, a flue system for a water heater is provided. The flue system includes an upstream heat exchange portion for providing a first pass for heat exchange with water in the water heater, and a downstream heat exchange portion for providing a second pass for heat exchange with water in the water heater. The downstream heat exchange portion includes at least one substantially vertical flue tube having an inner surface exposed to combustion products flowing through the vertical flue tube, and an outer surface exposed to water in the water heater. Each of the inner and outer surfaces is coated to reduce corrosion of the vertical flue tube.

In another exemplary embodiment, this invention provides an assembly for directing products of combustion between segments of a flue of a water heater. The assembly includes an insulator at least partially defining a chamber configured to direct products of combustion between the flue segments. The assembly also includes a cover configured to at least partially surround the insulator. The cover is configured to be coupled to a water tank of the water heater. In an uncompressed state, the insulator is dimensioned to extend outwardly from the cover when the insulator is positioned in the cover. In a compressed state, the insulator is dimensioned to permit coupling of the cover to the water tank.

In another exemplary embodiment, a method of providing an insulated passage for products of combustion between flue segments of a water heater is provided. The method includes positioning an insulator in a cover such that a portion of the insulator extends out of the cover. The method also includes compressing the extended portion of the insulator against a water tank of the water heater such that the cover is proximal to or touching the water tank. The method also includes coupling the cover to the water tank, thereby forming a sealed and insulated passage between the flue segments.

BRIEF DESCRIPTION OF THE DRAWINGS

These and other objects and advantages of the invention will be more fully understood with reference to the following detailed drawings, of which.

DETAILED DESCRIPTION OF THE PREFERRED EMBODIMENTS

Figure 1:
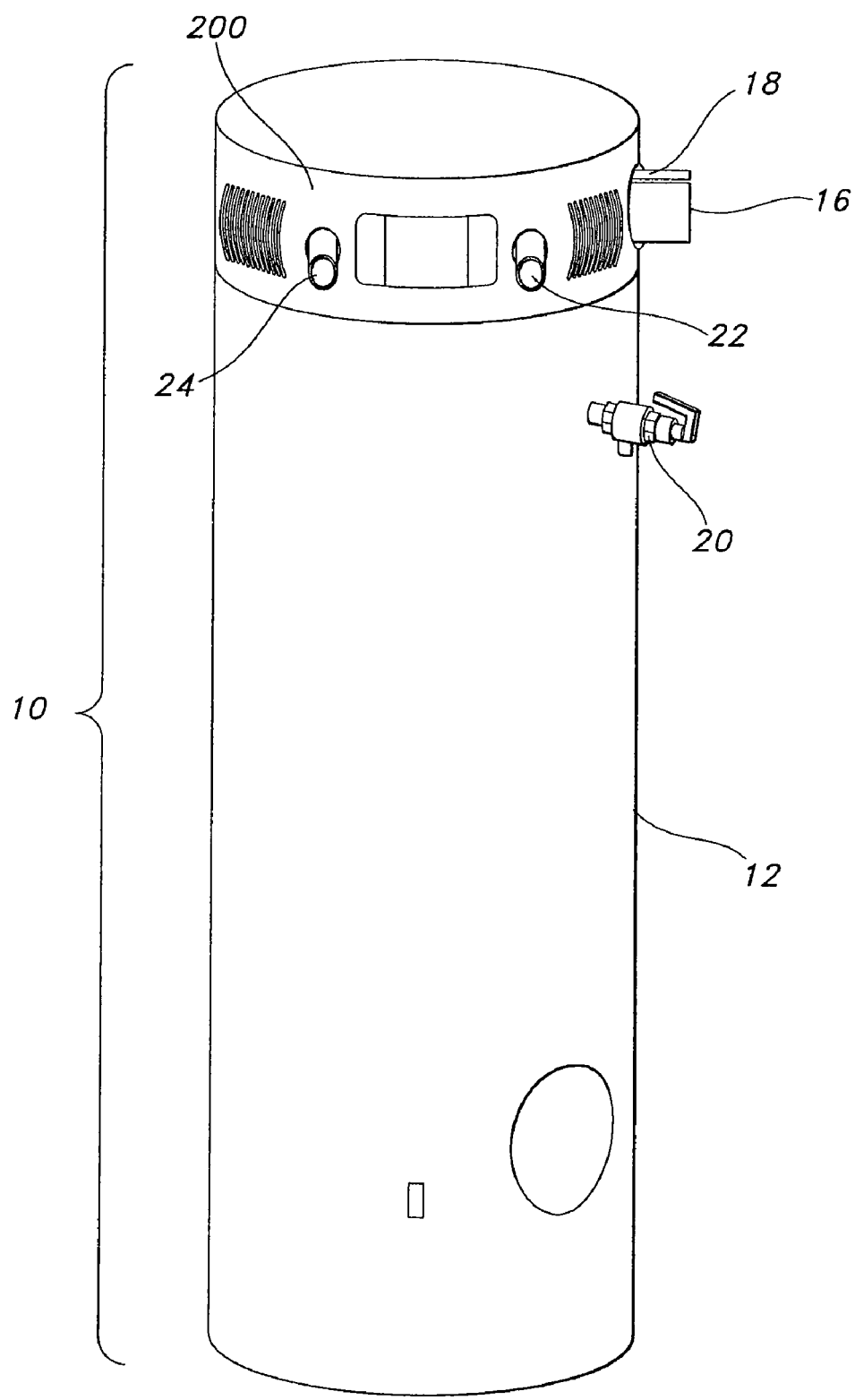
FIG. 1 is a top perspective view of an exemplary embodiment of a water heater according to aspects of this invention.

Exemplary features of selected embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the exemplary configurations and materials and sizes described hereafter can be modified within the scope of this invention.

Referring to the figures generally, in an exemplary embodiment of the present invention, a flue system is provided for a water heater such as a water heater 10 having improved heat exchange efficiency. The flue system includes an upstream heat exchange portion having at least one substantially vertical flue tube such as tube 26. The flue system also includes a downstream heat exchange portion having at least one substantially vertical flue tube such as tube 30. The upstream heat exchange portion provides a first pass for heat exchange with water in a water heater 10. The downstream heat exchange portion provides a second pass for heat exchange with water in the water heater 10.

In another exemplary embodiment, the water heater 10 includes a blower such as blower 104 configured to receive fuel and air. The blower 104 is oriented to deliver the fuel and air along a substantially vertical axis. The water heater 10 also includes a burner such as burner 102 positioned downstream from the blower 104 along the axis to receive the fuel and air. The burner 102 is configured to deliver the products of combustion of the fuel and air along the axis. The water heater 10 also includes flue tube 26 having a segment extending along the axis. The flue tube 26 is positioned to receive the products of combustion from the burner 102, and the flue tube provides a first pass for heat exchange with water in the water heater 10.

In another exemplary embodiment, a system 40 for exhausting combustion products and draining condensate from a flue system of a water heater 10 is provided. The system 40 includes a receptacle such as receptacle 64 positioned to collect combustion products and condensate from the flue system. The receptacle 64 defines an orifice such as orifice 68 positioned to exhaust combustion products from within the receptacle 64. The receptacle 64 also defines an outlet such as outlet 70 positioned to drain condensate from the receptacle 64.

In another exemplary embodiment, a flue system for a water heater 10 is provided. The flue system includes an upstream heat exchange portion 26 for providing a first pass for heat exchange with water in the water heater 10, and a downstream heat exchange portion for providing a second pass for heat exchange with water in the water heater 10. The downstream heat exchange portion includes at least one substantially vertical flue tube 30 having an inner surface exposed to combustion products flowing through the vertical flue tube 30, and an outer surface exposed to water in the water heater 10. Each of the inner and outer surfaces are coated to reduce corrosion of the vertical flue tube 30.

In another exemplary embodiment, an assembly 28 for directing products of combustion between segments of a flue of a water heater 10 is provided. The assembly 28 includes an insulator such as insulator 48 at least partially defining a chamber configured to direct products of combustion between the flue segments. The assembly 28 also includes a cover such as cover 56 configured to at least partially surround the insulator 48. The cover 56 is configured to be coupled to a water tank 12 of the water heater 10. In an uncompressed state, the insulator 48 is dimensioned to extend outwardly from the cover 56 when the insulator 48 is positioned in the cover 56. In a compressed state, the insulator 48 is dimensioned to permit coupling of the cover 56 to the water tank 12.

In another exemplary embodiment, a method of providing an insulated passage for products of combustion between flue segments of a water heater 10 is provided. The method includes positioning an insulator 48 in a cover 56 such that a portion of the insulator 48 extends out of the cover 56. The method also includes compressing the extended portion of the insulator 48 against a water tank 12 of the water heater 10 such that the cover 56 is proximal to or touching the water tank 12. The method also includes coupling the cover 56 to the water tank 12, thereby forming a sealed and insulated passage between the flue segments.

With general reference to the figures, one aspect of this invention provides a flue system for a water heater 10 having improved heat exchange efficiency. The flue system includes a primary heat exchange portion extending along an upstream segment of the flue system and having at least one substantially vertical flue tube 26. The flue system also includes a secondary heat exchange portion extending along a downstream segment of the flue system and having at least two substantially vertical flue tubes such as flue tubes 30A, 30B, and 36A-36H. The primary heat exchange portion provides a first pass for heat exchange with water in the water heater 10, and the secondary heat exchange portion provides second and third passes for heat exchange with water in the water heater 10.

According to another aspect of the invention, again referring generally to the figures, a water heater 10 having improved heat exchange efficiency is provided. The water heater 10 includes a blower 104 configured to receive a premix of fuel and air, wherein the blower 104 is oriented to deliver the premix along a substantially vertical axis. The water heater 10 also includes a burner 102 positioned downstream from the blower 104 along the axis to receive the premix. The burner 102 is configured to deliver the products of combustion of the premix along the axis. The water heater 10 also includes a flue tube having a segment 26 extending along the axis. The flue tube is positioned to receive the products of combustion from the burner 102, and the flue segment 26 provides a first pass for heat exchange with water in the water heater 10.

Referring now to FIG. 1, a commercial water heater embodying exemplary aspects of this invention is generally designated by the numeral "10." Although repeated reference will be made to "commercial" water heaters, the descriptions herein also apply to residential or domestic water heaters as well as other heat transfer systems.

The commercial water heater 10 includes a tank assembly 12 provided with a cover portion such as a head assembly 200. Commercial water heater 10 has an air inlet 16, which facilitates the introduction of air to the water heater's combustion system. The commercial water heater 10 also has a gas inlet 18, which facilitates the introduction of gas or other fuel. Commercial water heater 10 also is provided with a pressure relief valve assembly 20.

Unheated water is introduced into the water heater 10 by means of a cold or unheated water inlet 22. Heated water exits the water heater 10 by means of a heated or hot water outlet 24. Although not shown, commercial water heater 10 is optionally provided with a side inlet for unheated water that may be at a lower elevation, depending upon the preference of the user of the water heater 10 and the manner or location in which the water heater 10 is installed.

Referring now to FIGS. 2-5, an exemplary embodiment of a heat exchange system will be described. Arrows in FIGS. 2-5 indicate the flow of combustion products through the heat exchange system. Generally, the heat exchange system illustrated in the figures is a so-called "three pass" heat exchanger in which the combustion products make three passes through the water to be heated, thereby exchanging heat to the water in each of the three passes. Also, in the exemplary embodiment illustrated in the figures, the heat exchange system includes a primary heat exchange portion and a secondary heat exchange portion downstream from the primary heat exchange portion. In this particular embodiment, the first pass of the heat exchanger provides for the primary heat exchange and the second and third passes provide for the secondary heat exchange.

The ratio of the surface area of the secondary heat exchange to that of the primary heat exchange can be altered to optimize the efficiency of the water heater. For example, the ratio can be adjusted by modifying the number and/or size of flues in each of the primary and secondary heat exchanges. In one exemplary embodiment, however, the ratio is maintained at or near 3:1, although other ratios may be acceptable as well.

Additionally, the velocity at which the combustion products travel through the heat exchange system can also impact the efficiency of the water heater. For example, like the ratio of surface areas, the velocity of the combustion products at various segments of the heat exchange system is also dependent upon the number and/or size of flues selected. The number and/or size of the flues also impact the ratio of BTUs to heat exchange surface area.

Figure 2:
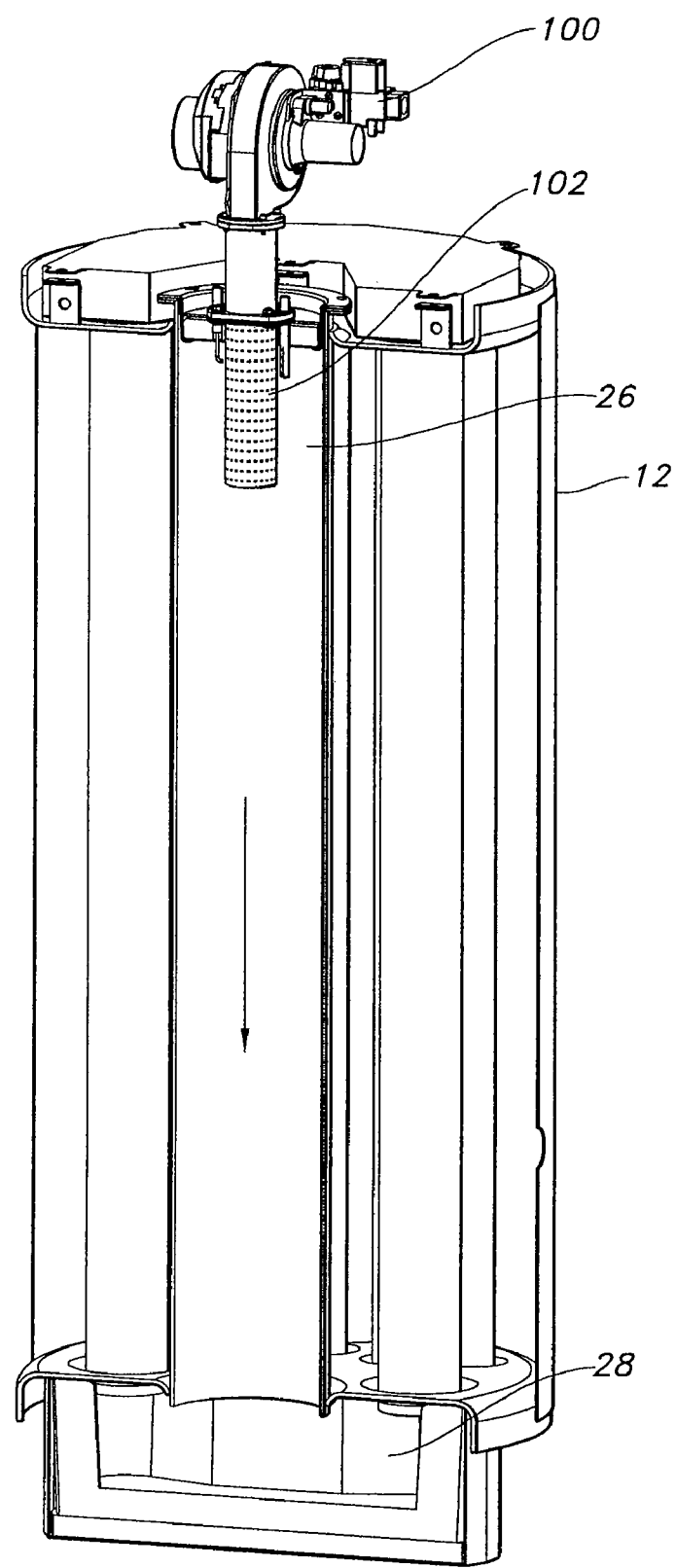
FIG. 2 is a cross-sectional perspective view of the water heater illustrated in FIG. 1.

Referring specifically to FIG. 2, a cross-sectional view of the commercial water heater 10 is provided to reveal internal features of the tank assembly 12. A blower and combustion assembly 100, which includes a burner 102, delivers hot combustion products downwardly from the top of the water heater 10 into a first pass flue 26, which makes a first pass extending through water in the water heater 10 and provides for primary heat exchange. FIG. 2 provides a cross-sectional view that cuts through the first pass flue 26. While a wide variety of materials and dimensions can be selected for first pass flue 26, one exemplary embodiment is a tube or pipe having an 8-inch outer diameter. The first pass flue 26 delivers combustion products from the burner 102 at the top of the water tank, through the water contained in the water tank, and into a first pass collector assembly 28, the details of which will be provided later with reference to FIG. 7.

Figure 3:
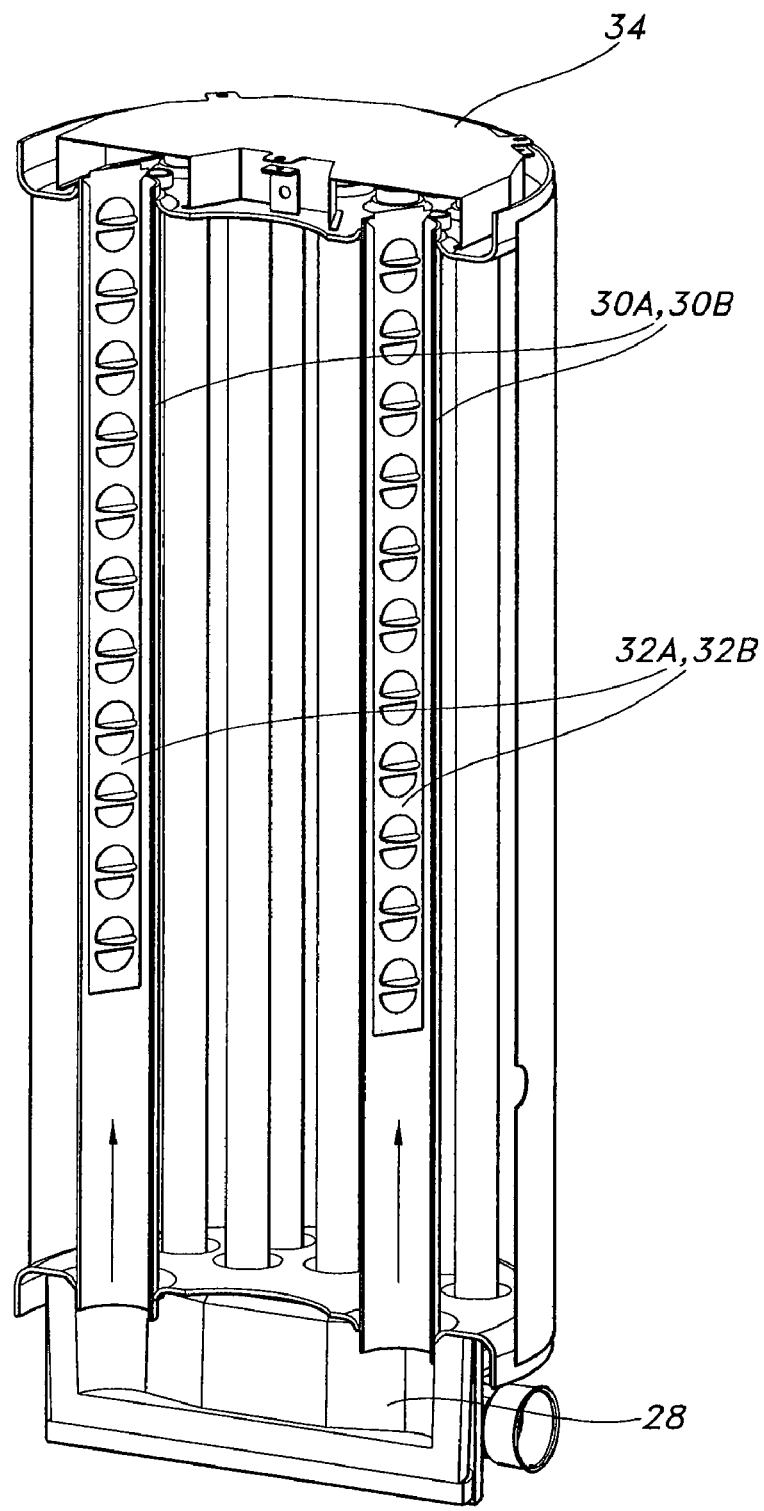
FIG. 3 is another cross-sectional perspective view of the water heater illustrated in FIG. 1.

Referring now to FIG. 3, which provides a cross-sectional view of the commercial water heater 10 that cuts through flues forming the second pass, the flow of combustion products from the first pass collector assembly 28 will be described. Specifically, combustion products from the first pass collector assembly 28 travel upwardly into two (2) second pass flues 30A, 30B. Although a variety of sizes can be selected, the exemplary embodiment of the commercial water heater 10 illustrated in the figures includes second pass flues 30A, 30B formed from pipe or tube having a four-inch outer diameter. Second pass flues 30A, 30B are provided with flue baffles 32A, 32B, respectively. The flue baffles 32A, 32B are provided to improve heat exchange from the combustion products in the second pass flues 30A, 30B to water in the water heater 10. From second pass flues 30A, 30B, combustion products are delivered into a second pass collector assembly 34, the details of which will be provided later with reference to FIG. 10.

Figure 4:
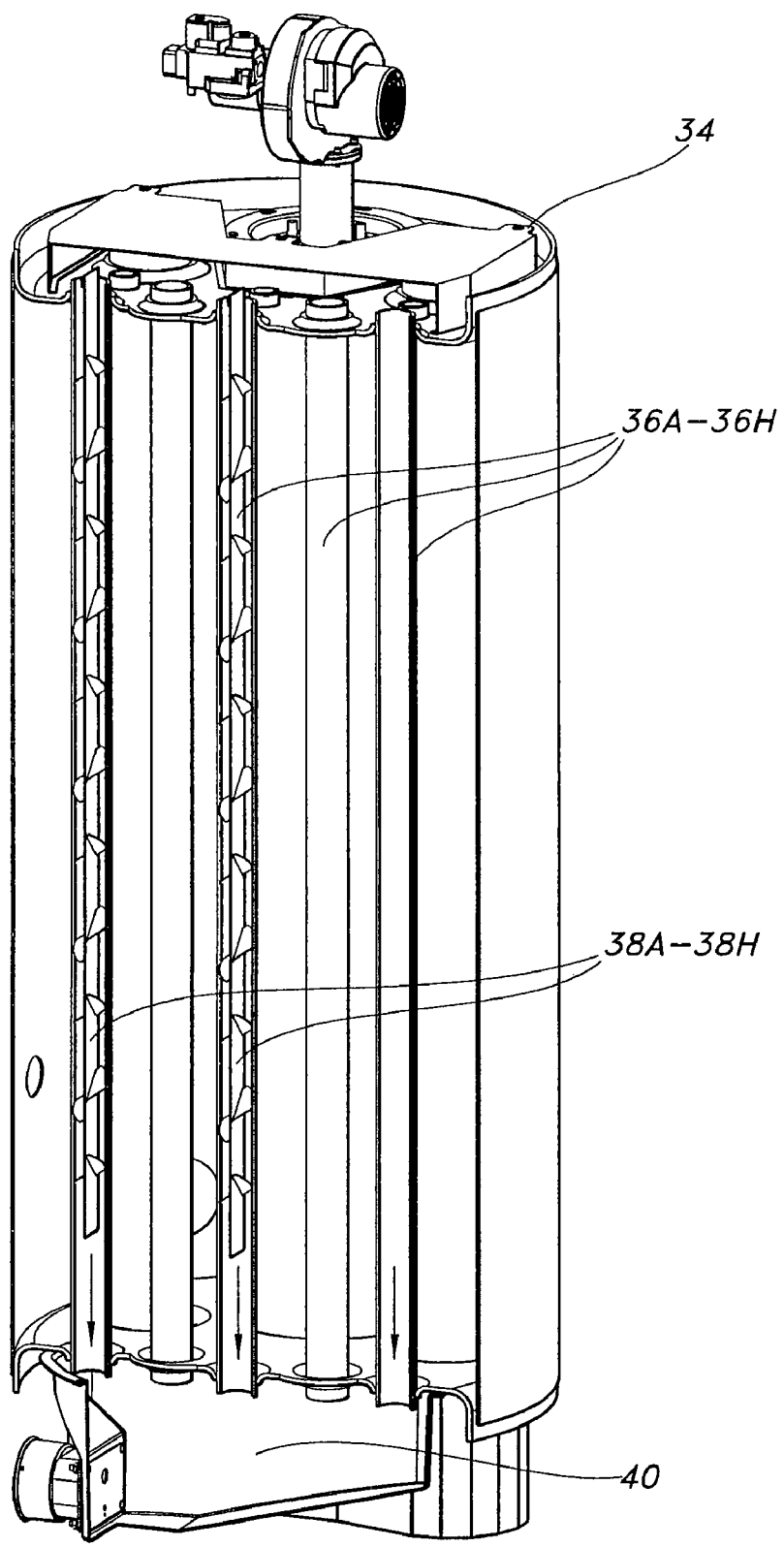
FIG. 4 is yet another cross-sectional perspective view of the water heater illustrated in FIG. 1.

Referring now to FIG. 4, which provides a cross-sectional view cutting through three (3) of eight (8) third pass flues, the flow of combustion products from the second pass collector assembly 34 will be described. Combustion products flow from the second pass collector assembly 34 into eight (8) third pass flues 36A-36H. Although a variety of sizes can be selected, the exemplary embodiment of the commercial water heater 10 illustrated in the figures includes third pass flues 36A-36H formed from pipe or tube having a two-inch outer diameter. The third pass flues 36A-36H are each provided with flue baffles 38A-38H, respectively, in order to optimize heat exchange. From third pass flues 36A-36H, the combustion products are delivered to an exhaust collector assembly 40 at the bottom of the commercial water heater 10 which will be described later in greater detail with reference to FIGS. 8 and 9.

Figure 5:
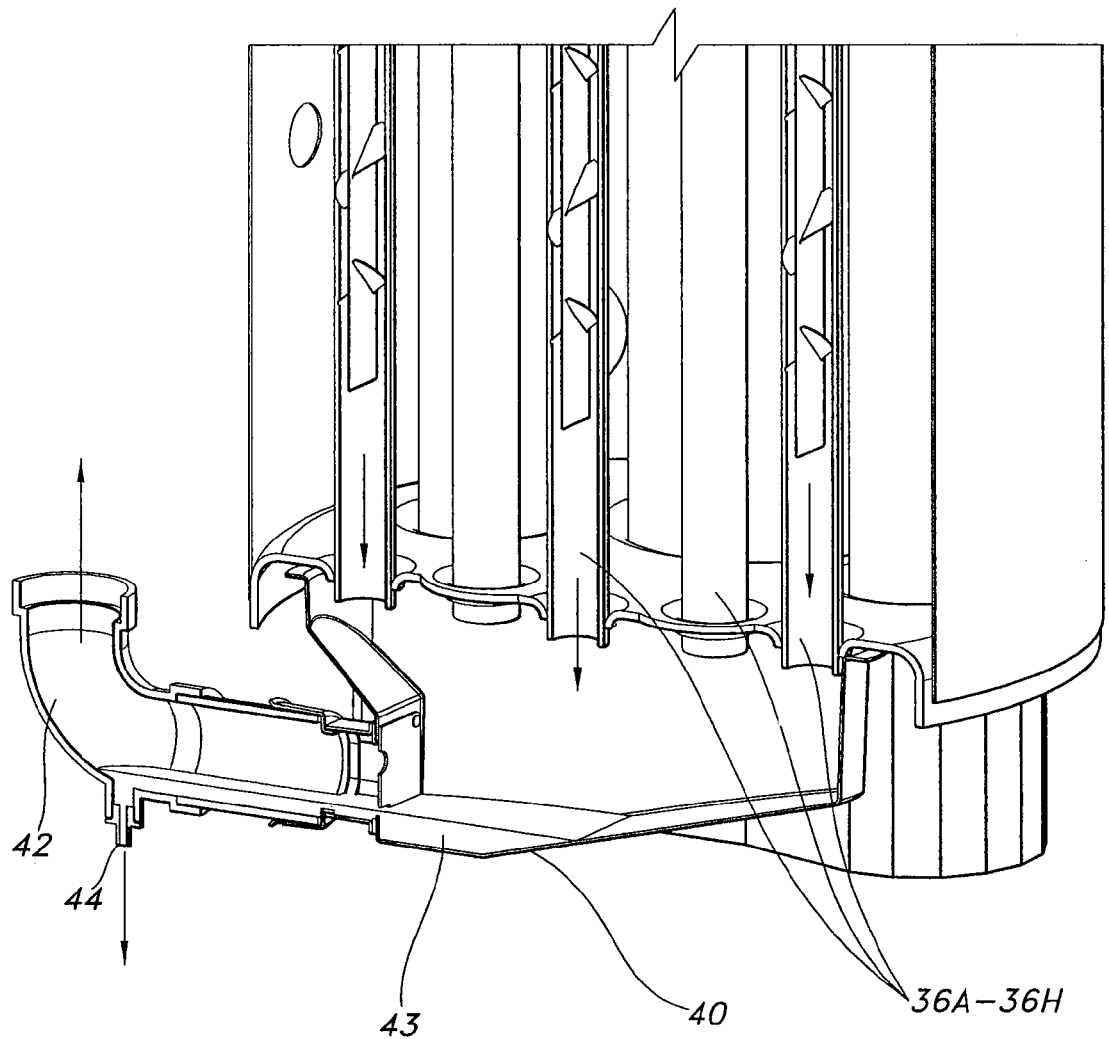
FIG. 5 is a cross-sectional perspective view of a lower portion of the water heater illustrated in FIG. 1.

Referring now to FIG. 5, which provides additional details of the exhaust system of the commercial water heater 10, further exemplary details of the third pass flues 36A-36H and exhaust collector assembly 40 will be described. As described previously, condensate will form in the heat exchange tubing (or flues) as the efficiency of heat exchange increases by virtue of the reduced temperature of the exhaust gases. More specifically, as the temperatures of the combustion products diminish in the third pass flues 36A-36H of the commercial water heater 10, water vapor in the combustion products will tend to condense on the interior surfaces of the flues. The commercial water heater 10 facilitates the transport of such condensate out of the water heater so as to reduce the corrosive impact of such condensate over time.

Each of the flues 26, 30A, 30B, and 36A-36H illustrated in FIGS. 2-5 are substantially straight and vertical in orientation. The straight configuration and vertical orientation have been discovered to reduce the corrosive effect of condensation. More specifically, gravity encourages the downward flow of condensate along the vertical surfaces of the heat exchange tubes. The elimination of horizontal surfaces reduces the tendency for condensate to remain on the heat exchange surfaces. Also, the second pass and third pass flues 30A, 30B, and 36A-36H are coated on their inside and/or outside surfaces. Such a coating helps to protect the flues against the corrosive effect of the condensate. In one exemplary embodiment, second pass and third pass flues 30A, 30B, and 36A-36H are glass lined. The first pass flue 26 is also optionally lined.

As shown in FIG. 5, an exhaust elbow or conduit 42 is connectable to the exhaust collector assembly 40 of the commercial water heater 10. Condensate from the third pass flues 36A-36H will travel by gravity downwardly in the vertical third pass flues and into the exhaust collector assembly 40. The condensate is indicated by the numeral "43" in FIG. 5. The commercial water heater 10 is provided with a condensate outlet 44, which leads to a condensate drain or a condensate pump or other means for permitting the condensate to flow or be withdrawn from the water heater 10. Exemplary details of the exhaust collector assembly 40 will be described later with reference to FIG. 9.

Figure 6A:
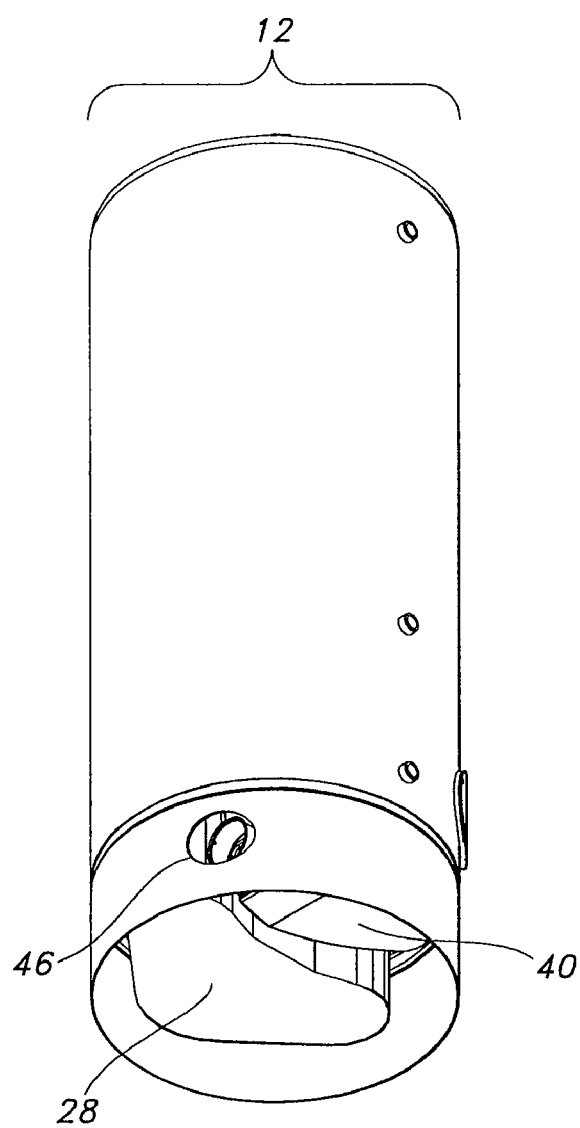
FIG. 6A is a bottom perspective view of an exemplary embodiment of a tank assembly according to aspects of this invention.
Figure 6B:
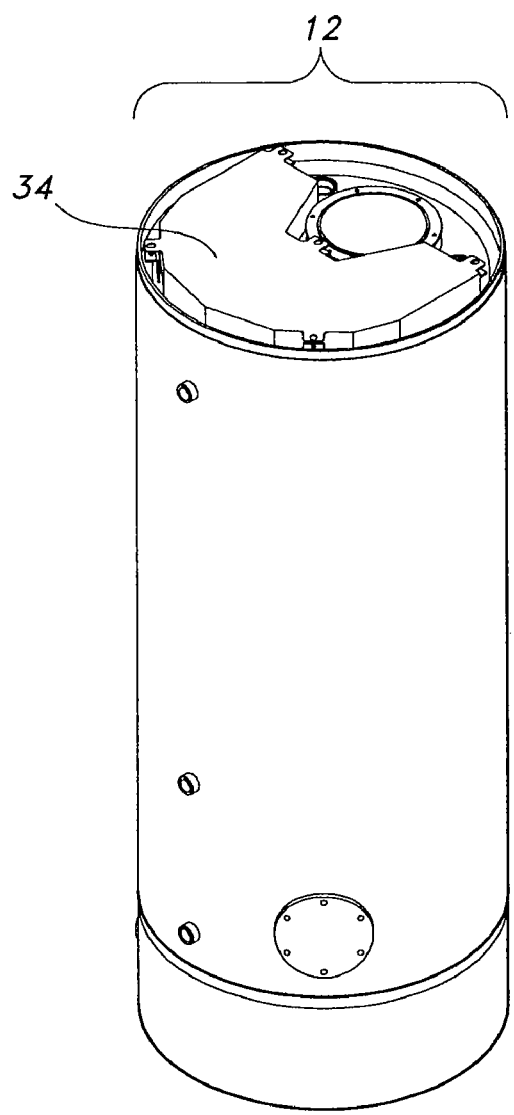
FIG. 6B is a top perspective view of the tank assembly illustrated in FIG. 6A.

FIGS. 6A and 6B show bottom perspective and top perspective views of the commercial water heater 10, respectively. As shown in FIG. 6A, the tank assembly 12 of the water heater 10 includes the first pass collector assembly 28 and the exhaust collector assembly 40 in a bottom portion of the assembly. The water heater 10 is also provided with an orifice 46 in the tank assembly 12 through which an exhaust conduit such as conduit 42 can extend. As shown in FIG. 6B, the tank assembly 12 includes the second pass collector assembly 34 in a top portion of the assembly.

Figure 7:
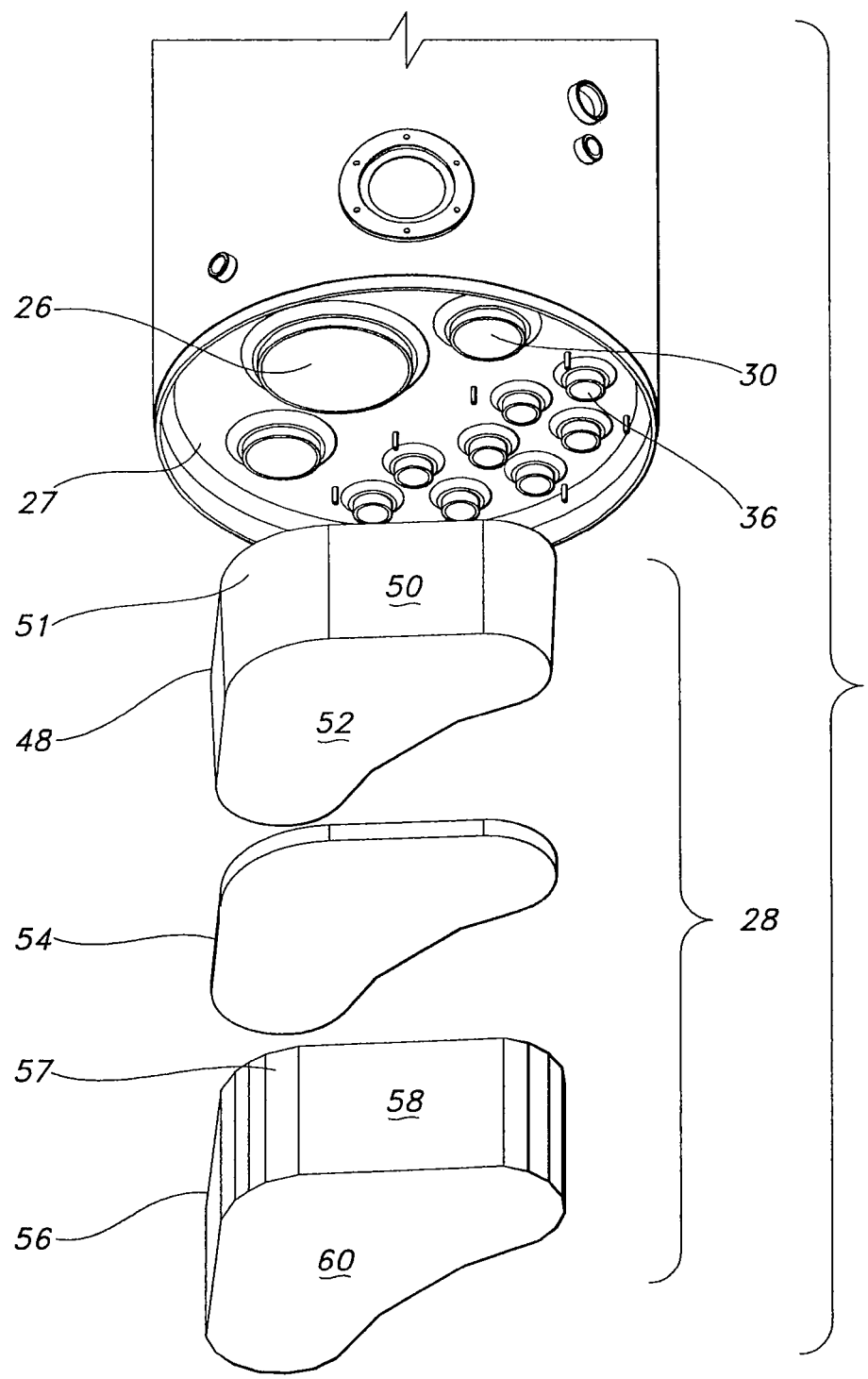
FIG. 7 is a bottom exploded perspective view of a lower portion of the tank assembly illustrated in FIG. 6A.

Referring now to FIG. 7, further details of the first pass collector assembly 28 will be provided. The first pass collector assembly 28 generally provides a chamber that communicates with the first pass flue 26 and the second pass flues 30A, 30B, thereby facilitating the flow of combustion products from the first pass flue 26 to the second pass flues 30A, 30B. The first pass collector assembly 28 includes a primary refractory 48, which is configured to reduce heat loss from the combustion products as they are transported from the first pass flue 26 to the second pass flues 30A, 30B. The primary refractory is optionally formed from a high-density insulation. In an exemplary embodiment, the primary refractory 48 includes a wall portion 50 and a base portion 52. The wall and base portions 50 and 52 can be formed from a layer of insulation that can be up to or exceeding one and a half inches in thickness. Wall portion 50 includes an upper wall portion 51 that includes a surface that contacts a bottom 27 of the water tank.

The first pass collector assembly 28 also includes a secondary refractory 54 that is positioned adjacent to the base portion 52 of the primary refractory 48. The secondary refractory 54 adds an additional layer of insulation and can be formed from the same material as primary refractory 48. For example, if the wall and base portions 50 and 52 of the primary refractory 48 have thicknesses of about one and a half inch, then the addition of the secondary refractory 54 adds an additional thickness of perhaps up to or exceeding one inch. The first pass collector assembly also includes a collector cover 56 having a wall portion 58 and a base portion 60. Wall portion 58 includes an upper wall portion 57 that includes a surface that may be welded or otherwise coupled to water tank bottom 27. While the collector cover 56 can be formed from a wide variety of materials, one exemplary embodiment of the collector cover 56 is formed from sheet metal.

In order to provide a seal between the first pass collector assembly 28 and the bottom of the water heater tank, a primary seal is formed by compression of the upper edge of the wall portion 50 of the primary refractory 48 against the bottom surface of the water tank. A secondary seal can be provided by means of a weld between the collector cover 56 and the base of the water tank along the upper edge of the wall portion 58 of the collector cover 56.

Figure 7A:
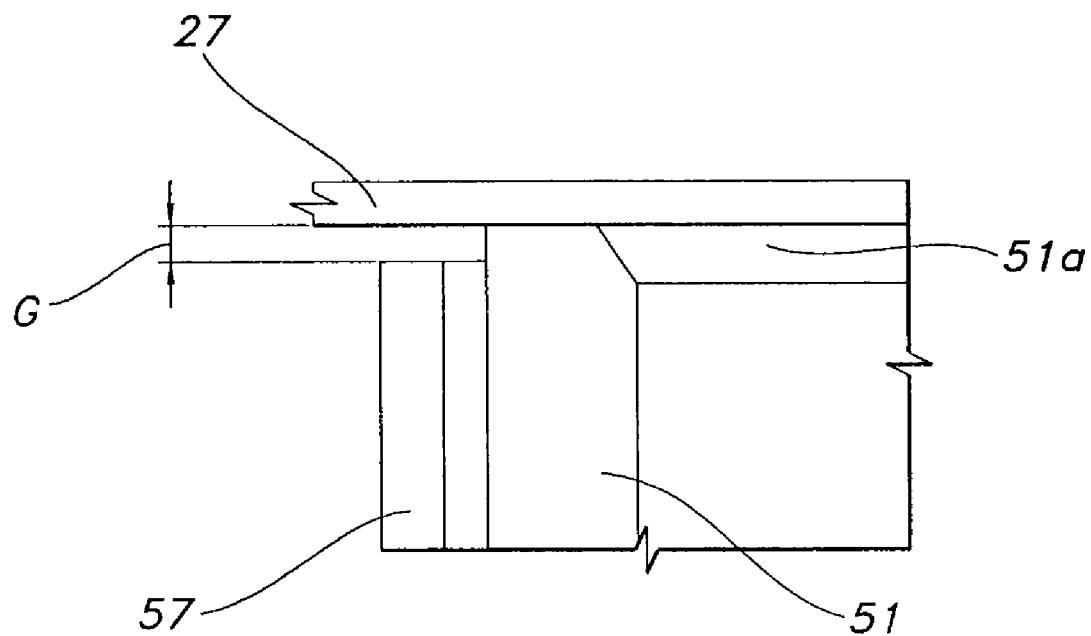
FIG. 7a is a partial cross sectional view of a collector assembly in accordance with an exemplary embodiment of the present invention.

FIG. 7a is a cross sectional side view of a portion of collector cover 56, refractory 48, and water tank bottom 27. FIG. 7a illustrates a configuration in which the upper wall portion 51 of the wall portion 50 of the refractory 48 is in substantially continuous contact with water tank bottom 27. However, collector cover 56 has not compressed refractory 48, and as such, collector cover 56 is not in contact with or directly proximal to water tank bottom 27.

More specifically, upper wall portion 51 of wall portion 50 of refractory 48 extends outwardly (upwardly in FIG. 7a) beyond the upper wall portion 57 of the wall portion 58 of the cover 56 such that refractory 48 may be compressed against water tank bottom 27. For example, when upper wall portion 57 is in contact with water tank bottom 27 (or is proximal to water tank bottom 27), refractory 48 has been compressed so that a seal is formed between upper wall portion 51 and water tank bottom 27.

As shown in FIG. 7a, upper wall portion 51 includes a contour, such as a beveled edge 51a, to decrease the surface area of contact between the refractory 48 and the water tank bottom 27. By including beveled edge 51a, the surface area of upper wall portion 51 that contacts water tank bottom 27 is decreased, thereby reducing the surface area that must be compressed to form a seal between the water tank and the refractory. Further, by including beveled edge 51a, the pressure of the refractory 48 against water tank bottom 27 is increased, thereby forming a better seal. Further still, beveled edge 51a distributes the compression load across 2 axes (i.e., the vertical axis along which wall portion 50 extends, and the horizontal axis along which water tank bottom 27 extends).

Figure 7B:
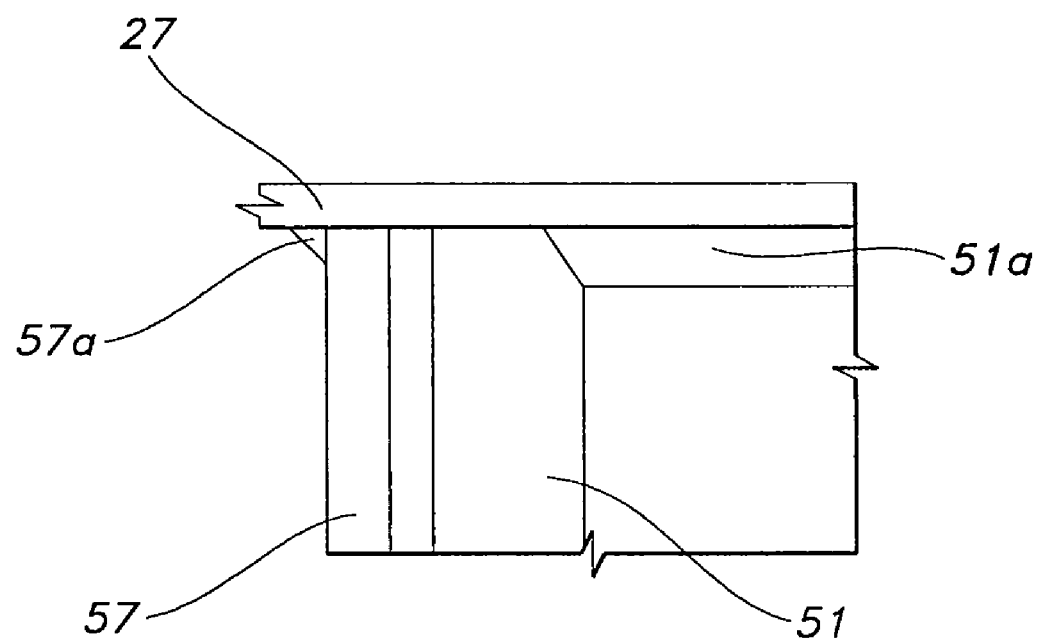
FIG. 7b is another partial cross sectional view of a collector assembly in accordance with an exemplary embodiment of the present invention.

Although a bevel is illustrated in FIGS. 7a and 7b, other contours can be selected to decrease the surface area of contact between the refractory and the water tank bottom. Any contour can be used to reduce the surface area to less than that of the cross-sectional area of the refractory.

FIG. 7a also illustrates upper wall portion 57 of wall portion 58 of collector cover 56. In the exemplary embodiment shown in FIG. 7a, collector cover 56 has not yet compressed refractory 48 (or the refractory 48 has not been otherwise compresses). Consequently, upper wall portion 57 is not in contact with or directly proximal to water tank bottom 27. As shown in FIG. 7a, upper wall portion 57 is separated from water tank bottom 27 by a gap G.

The size of gap G depends upon various factors. For example, gap G is selected based upon the density or compressibility of the material chosen to form refractory 48, the size and dimensions of refractory 48, and the pressure desired to form a seal between the refractory 48 and the water tank bottom 27.

In an exemplary embodiment of the present invention, gap G is at least about 3/16" though smaller and bigger gaps are contemplated as well. The size of gap G may therefore be modified depending upon the material selected for refractory 48, the degree of seal desired, and the dimensions of refractory 48 (e.g., wall thickness, depth, width of beveled edge 51a, etc.). In this embodiment, by bringing upper wall portion 57 of the collector cover 56 into contact with water tank bottom 27, refractory 48 is compressed by at least about 3/16", thereby providing a seal between refractory 48 and water tank bottom 27.

In FIG. 7b, collector cover 56 has compressed refractory 48 (or refractory 48 has been otherwise compressed) such that upper wall portion 57 of wall portion 58 (of collector cover 56) is now proximal to or in contact with water tank bottom 27. It is not necessary that refractory 48 be completely compressed against water tank bottom 27, but refractory 48 is preferably compressed to the extent that a seal is formed against water tank bottom 27.

In the exemplary embodiment illustrated in FIG. 7b, a weld 57a or other coupling is provided between upper wall portion 57 and water tank bottom 27, thereby providing a secondary seal between first pass collector assembly 28 and water tank bottom 27 (in addition to the primary seal provided by refractory 48). Weld 57a may be a 360 degree weld, as opposed to a tack weld, such that the entire perimeter of upper wall portion 57 is welded to water tank bottom 27. Alternatively, one or more fasteners or mechanisms can be used to couple the upper wall portion 57 of the collector cover 56 adjacent to the water tank bottom 27.

Figure 8:
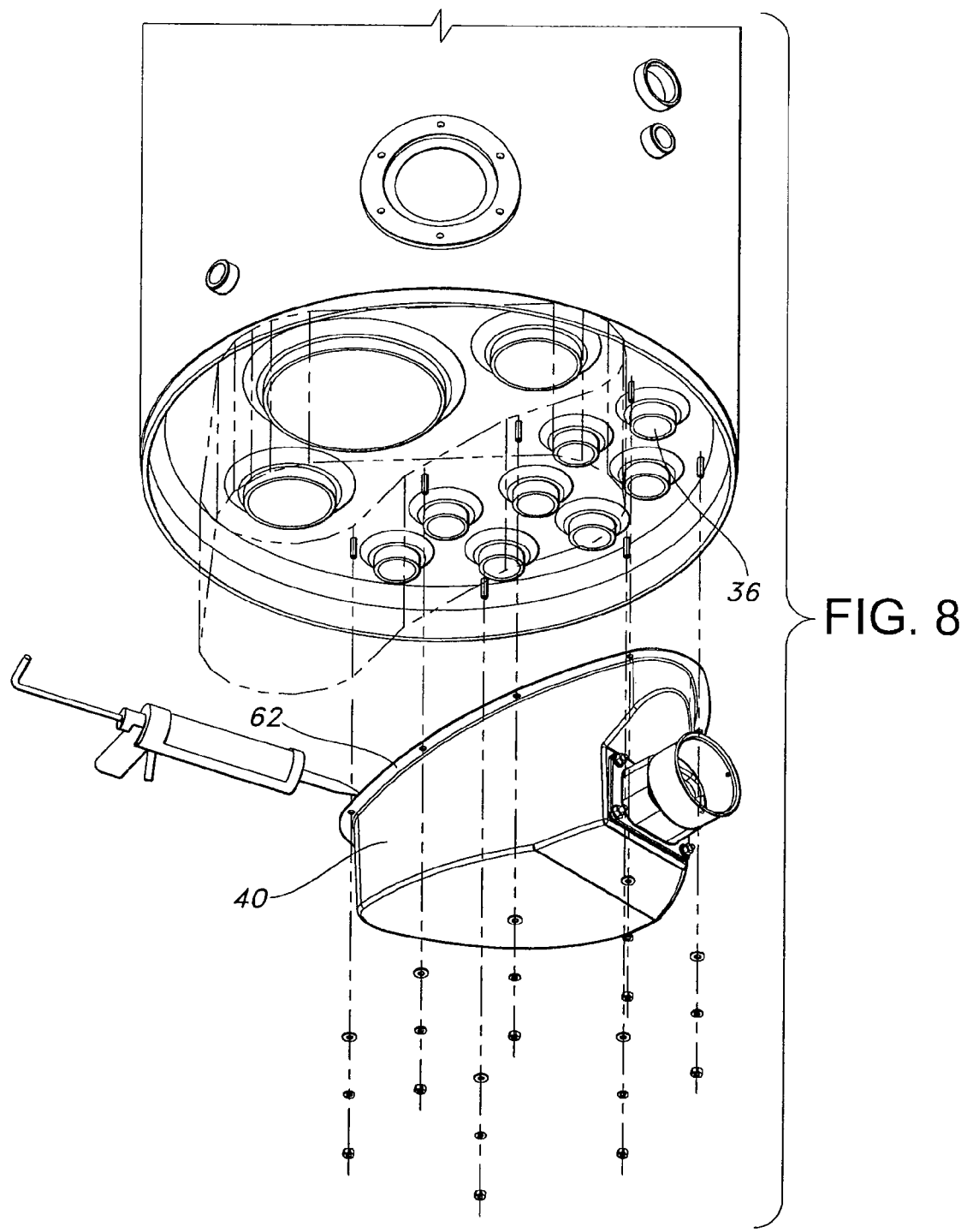
FIG. 8 is another bottom exploded perspective view of the lower portion of the tank assembly illustrated in FIG. 6A.
Figure 9:
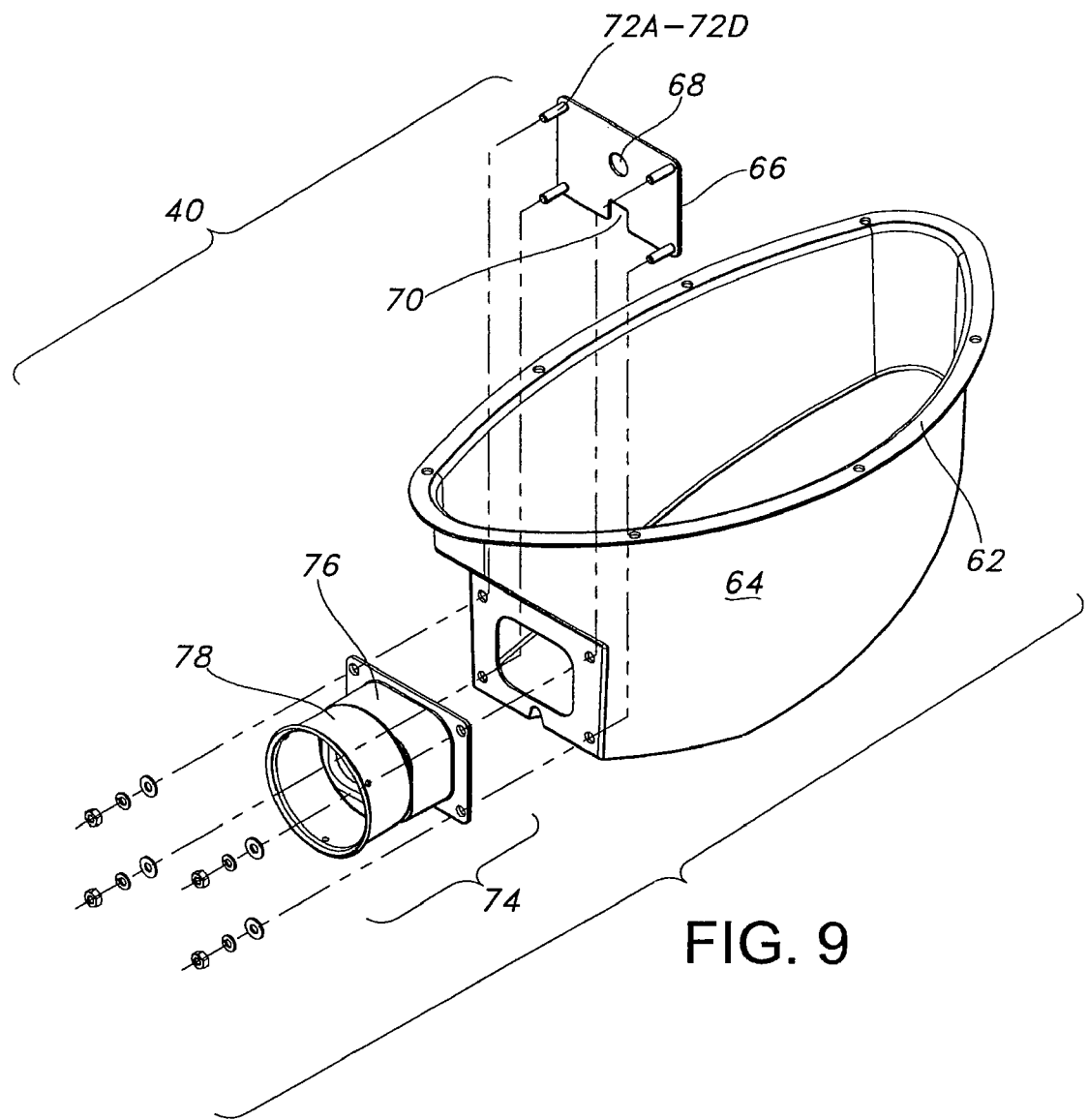
FIG. 9 is an exploded perspective view of an exemplary embodiment of an exhaust collector assembly according to aspects of this invention.

Referring now to FIGS. 8 and 9, further exemplary features of the exhaust collector assembly 40 will be described. As is illustrated in FIG. 8, the exhaust collector assembly 40 is engaged to a bottom surface of the water tank by means of a series of fasteners extending through a flange 62. As illustrated in FIG. 8, caulking or other filler or adhesives can be used to create a seal between the top of the exhaust collector assembly 40 and the bottom of the water heater tank. The exhaust collector assembly 40 provides a chamber for receiving the combustion products and condensate from each of the third pass flues 36A-36H. In that manner, the combustion products can be directed toward the exhaust conduit 42 (shown in FIG. 5). Also, the condensate can be collected from the flue tubes for delivery to the condensate outlet 44 (also shown in FIG. 5).

Referring now to FIG. 9, exemplary features of the components of the exhaust collector assembly 40 will be described. Exhaust collector assembly 40 includes an exhaust collector basin 64 that forms a receptacle. Although a wide variety of configurations and materials can be selected, exhaust collector basin 64 is optionally molded from ABS or another suitable plastic material. The wall of the basin 64 is sized and shaped to encompass the outlets of the third pass flues 36A-36H.

Exhaust collector assembly 40 also includes an orifice plate 66 that defines an exhaust orifice 68, through which exhaust is permitted to flow from the exhaust collector basin 64 toward the exhaust conduit 42. The orifice plate 66 also defines a condensate notch 70 through which condensate is permitted to flow from exhaust collector basin 64 toward the condensate outlet 44. The orifice plate 66 can be provided with a series of studs 72A-72D for mounting the orifice plate 66 to the exhaust collector basin 64. Although a variety of materials can be selected, orifice plate 66 may be advantageously formed from stainless steel.

It has been discovered that the size of the exhaust orifice 68 can be changed to modify the BTUs generated by the commercial water heater 10. While a variety of sizes can be selected, the exhaust orifice 68 in one exemplary embodiment ranges from about one inch to about one and one-quarter inch in diameter, although smaller and larger orifices are contemplated as well. In the illustrated embodiment, an orifice diameter of about one and one-eighth inch has been selected. In order to increase the BTU input of the water heater 10, the orifice size of the exhaust orifice 68 can be increased. Conversely, making the exhaust orifice 68 smaller can decrease the BTU input.

The exhaust collector assembly 40 is also provided with an exhaust adapter 74 in order to facilitate a connection between the exhaust collector basin 64 and the exhaust conduit 42. The exhaust adapter 74 can be molded from ABS, although other materials and forming methods are contemplated as well. The exhaust adapter 74 includes a mounting component 76 which receives the studs 72A-72D of the orifice plate 66 and provides a flange to facilitate the mounting of the exhaust adapter 74 and the orifice plate 66 to the exhaust collector basin 64. The exhaust adapter 74 also includes a mating component 78 that is connected to the mounting component 76. The mating component 78 provides surfaces to which the exhaust conduit 42 can be connected.

Figure 10:
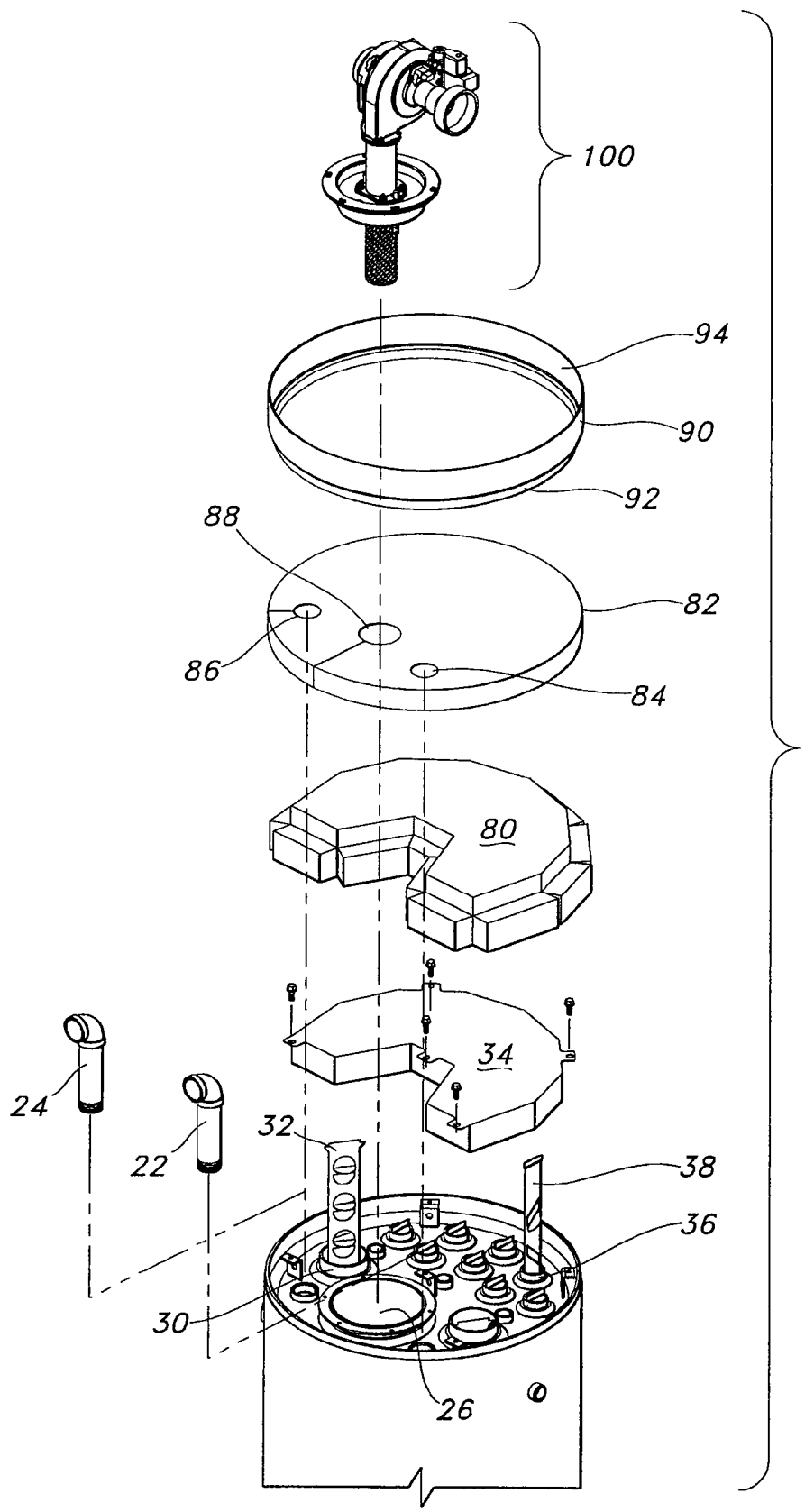
FIG. 10 is a top exploded perspective view of the tank assembly illustrated in FIG. 6B.
Figure 11A:
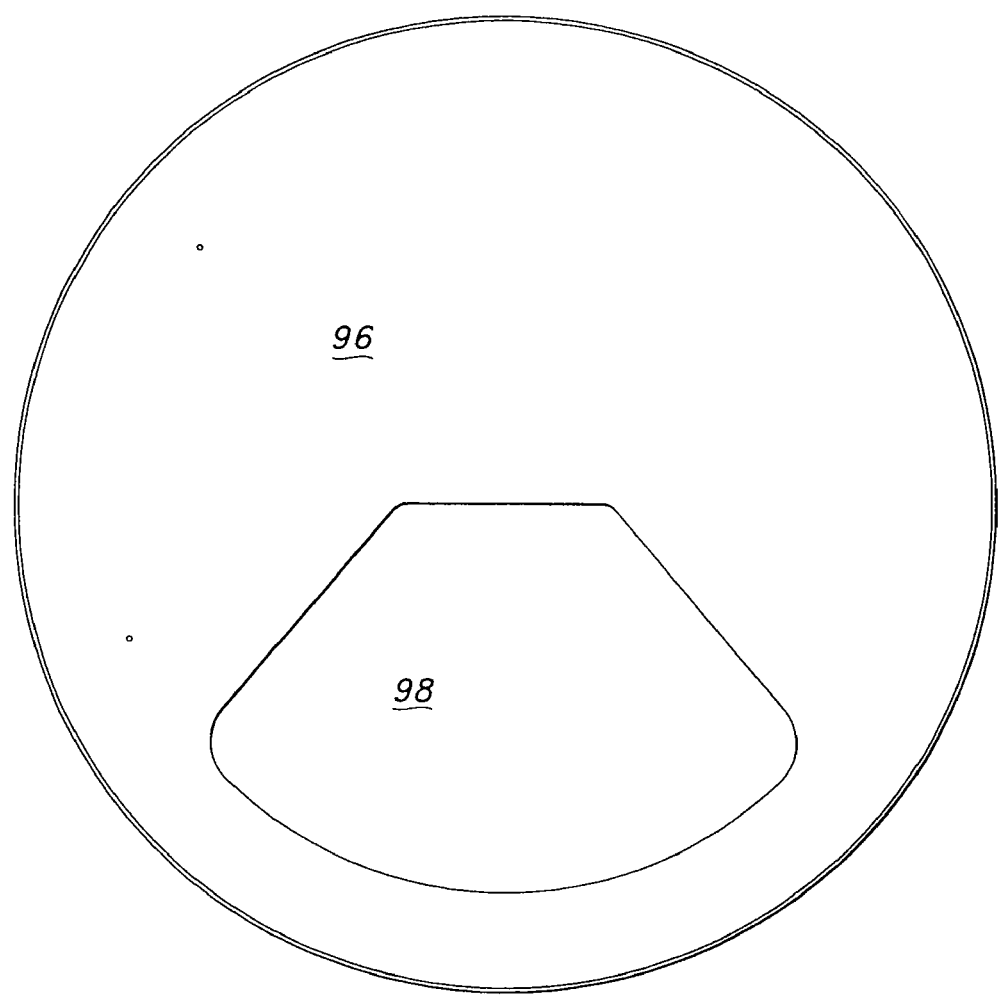
FIG. 11A is a top view of an exemplary embodiment of a combustion surround base according to aspects of this invention.
Figure 11B:
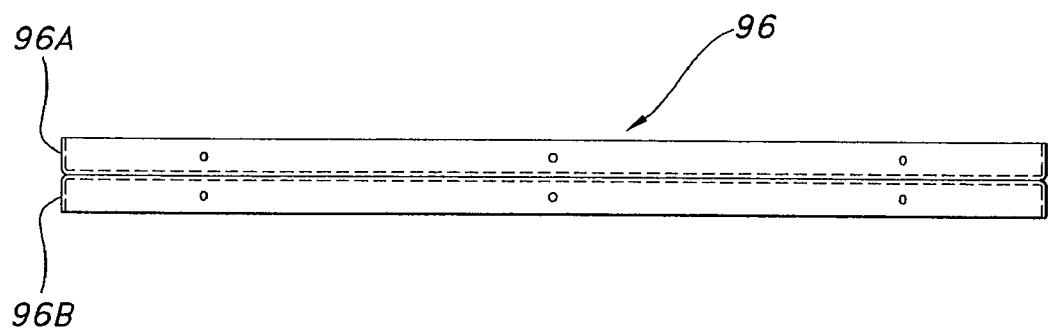
FIG. 11B is a side view of the combustion surround base illustrated in FIG. 11A.

Referring now to FIGS. 10 and 11A and 11B, exemplary features of a top portion of the commercial water heater 10 will be described. FIG. 10 provides an exploded view of the upper components of the commercial water heater 10, revealing the unheated water inlet 22, the heated water outlet 24, the first pass flue 26, a second pass flue 30 and its corresponding baffle 32, and a third pass flue 36 and its corresponding baffle 38. The baffles 32 and 38 are shown as extending from their respective flues 30 and 36 for purposes of illustration.

The second pass collector assembly 34 is mounted to the top of the water tank by means of collector brackets extending upwardly from the upper surface of the tank's head. A fastener such as a bolt is used to engage flanges provided on the second pass collector assembly 34 to the collector brackets. A layer of caulking or other sealant can be used to form a seal between the base portion of the second pass collector assembly 34 and the upper surface of the tank head.

The second pass collector assembly 34 provides a chamber for receiving combustion products from the second pass flues 30A, 30B, and for delivering those combustion products to the third pass flues 36A-36H. Accordingly, the second pass assembly is shaped to cover each of the openings of the second pass flues 30A, 30B and third pass flues 36A-36H. The second pass collector assembly 34 can be formed from a wide variety of materials and is optionally formed from stainless steel such as 316 SST.

A second pass collector insulator 80 is provided to fit over the top of the second pass collector assembly 34. The embodiment of the second pass insulator 80 illustrated in FIG. 10 is formed from a sheet of insulation that is scored to permit the perimeter portions to be folded down so as to conform to and surround the walls of the second pass collector assembly 34. Both the second pass collector assembly 34 and the second pass insulator 80 are provided with contours to accommodate portions of the blower and combustion assembly 100.

Another layer of insulation, in the form of insulator 82, is provided over the second pass collector insulation 80. Insulator 82 can be formed from a wide variety of insulating materials, but is optionally formed from a lamination of two or more insulating materials. Insulator 82 is provided with three (3) orifices; namely, an orifice 84 to accommodate the unheated water inlet 22, an orifice 86 to accommodate the heated water outlet 24, and an orifice 88 to accommodate a portion of the blower and combustion assembly 100.

A combustion ring 90 surrounds the insulator 82 and provides a transition for connection between the water tank of the water heater 10 and the outer jacket (not shown) of the water heater 10. More specifically, the combustion ring 90 includes a smaller diameter portion 92 at a lower end for mating with a surface of the water tank and a larger diameter portion 94 at an upper end for mating with a surface of the outer jacket. The space between the outer wall surface of the water tank and the inner wall surface of the jacket will be at least partially filled with insulation, and the combustion ring 90 helps to maintain a consistent annular space between the tank and the jacket. While it can be formed from a wide variety of materials, one exemplary material for combustion ring is sheet metal.

Referring now To FIGS. 11A and 11B, a combustion surround base 96 is illustrated for use at the top portion at the water tank. Although not shown in FIG. 10, the combustion surround base 96 is positioned so as to connect to the top portion of the combustion ring 90. As shown in FIG. 11B, the combustion surround base 96 is formed from a pair of flanged sheets 96A and 96B, which are fastened to one another in a back-to-back arrangement. As is illustrated in FIG. 11A, the flanged sheets 96A and 96B of the combustion surround base 96 are provided with an access opening 98 to permit access to the blower and combustion system 100 as well as the inlet 22 and outlet 24 for maintenance.

Figure 12:
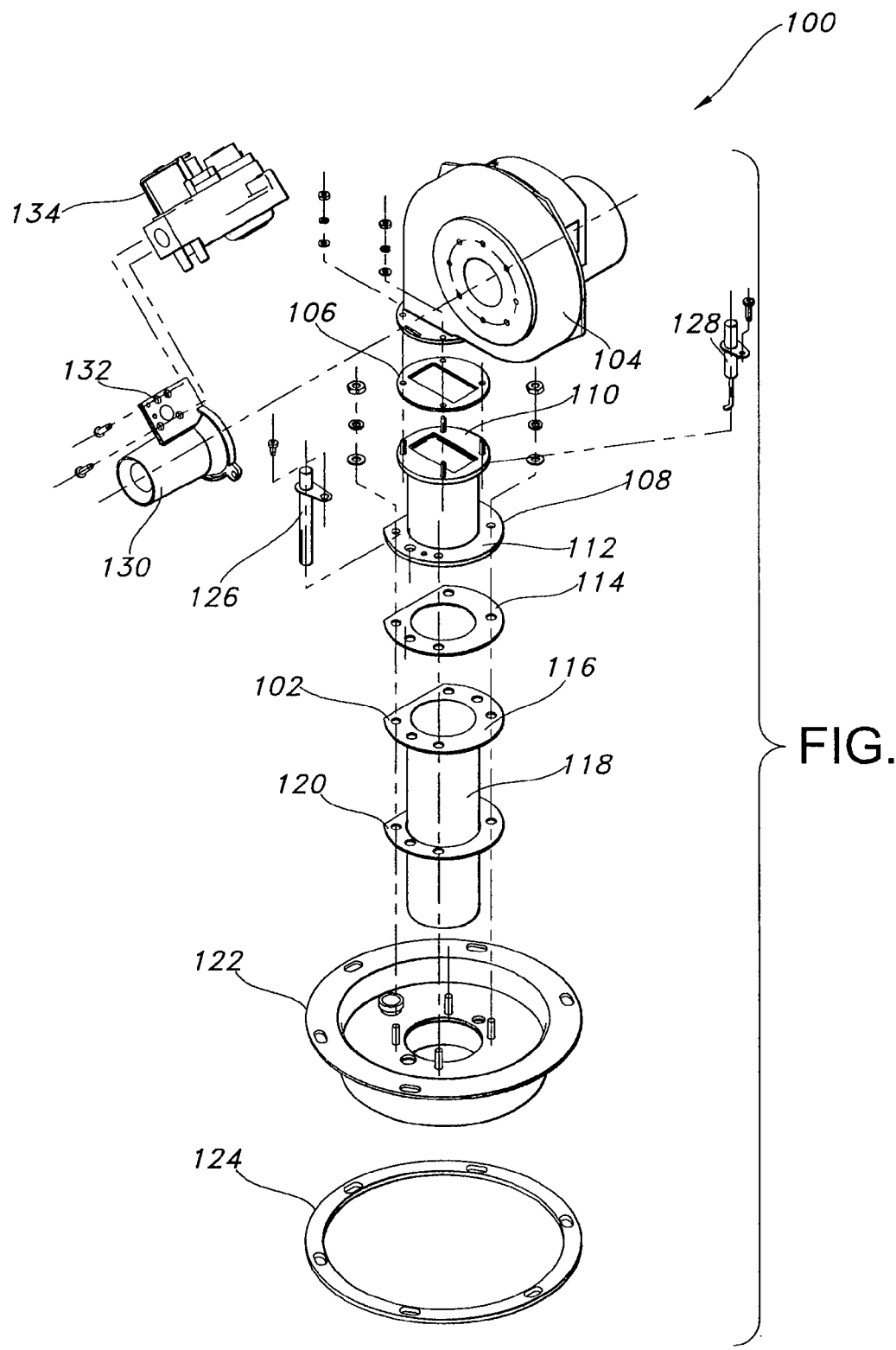
FIG. 12 is a top exploded perspective view of an exemplary embodiment of a blower and combustion assembly according to aspects of this invention.

Referring now to FIGS. 12-16, features of one exemplary embodiment of the blower and combustion system 100 will now be described. The exploded illustration in FIG. 12 illustrates various components of the assembly 100, and several illustrations of exemplary components of the assembly 100 are shown in FIGS. 13-16. The blower and combustion assembly 100 includes a blower 104 and a blower gasket 106. Although various blowers may be selected for use in the blower and combustion assembly, one exemplary blower is a DC blower such as Model No. RG148 provided by EBM Industries, Inc. of Farmington, Conn., which is a ⅐ HP blower operating at 6400 RPM.

The assembly 100 also includes a burner transition tube 108 having an upper flange 110 and a lower flange 112. The burner transition tube 108 provides a transition between the flange of the blower 104 and the flange of the burner 102. A burner gasket 114 is provided below the lower flange of the burner transition tube 108. The burner 102 has an upper flange 116 and a burner body 118 as well as a lower burner gasket 120. Although various burners may be selected for use in the blower and combustion assembly, one exemplary burner is a radial burner such as those provided by Burner Systems International, Inc. of Chattanooga, Tenn.

A burner mounting flange assembly 122 is provided as a component of the blower and combustion assembly 100 in order to facilitate mounting of the blower/burner assembly to the water tank. Further details of the burner mounting flange assembly 122 will be provided later in connection with a description of FIG. 15. Finally, a mounting flange gasket 124 formed from a fibrous gasket material or neoprene, for example, is provided to create a seal between the burner mounting flange assembly 122 and the water tank. By virtue of threaded fasteners or other fastening means together with gaskets 106, 114, 120, and 124, the components 104, 108, 102, and 122 are mounted with respect to one another to form a sealed system.

An igniter 126 is mounted to the lower flange 112 of the burner transition tube 108 to provide for ignition of the burner 102. Although various igniters may be selected for use in the blower and combustion assembly, an exemplary hot surface ceramic igniter is provided by Saint-Gobain Igniter Products of Milford, N.H. An ignition controller, such as the Series 1013 ignition controller of United Technologies, is optionally used.

A flame sensor 128 is also mounted to the lower flange 112 of the burner transition tube 108 in order to sense the presence or absence of a flame emanating from the burner 102. The flame sensor 128 may operate by flame rectification, such as sensors available from Precision Speed Equipment, or other sensor types can be selected. As is illustrated in the exemplary embodiment shown in FIG. 12 (and also shown in FIG. 13), the igniter 126 and the sensor 128 are optionally oriented at opposite sides of the burner 102 (i.e., separated by 180 degrees). Other configurations are contemplated as well.

The blower and combustion assembly also includes an air intake and gas mixer 130 having a gas valve mounting flange 132. The air intake and gas mixer 130 can be a venturi such those offered by Honeywell International, Inc. A gas valve 134 is connected to the flange 132 of the air intake and gas mixer 130, and the air intake and gas mixer 130 is in turn mounted to the body of the blower 104. Although various gas valves may be selected for use in the blower and combustion assembly, one exemplary gas valve is offered under Model No. VK8115, by Honeywell International, Inc.

Accordingly, the premix of fuel and air (provided by the gas valve 134 and the air intake and gas mixer 130) is provided upstream of the blower 104. Accordingly, the blower and combustion assembly 100 provides a negative premix gas-fired combustion system. The outlet of the blower 104 and the body 118 of the burner 102 are both oriented along the same vertical axis. It has been discovered that this orientation of the blower 104 and the burner 102 tends to increase the heat exchange between the combustion products and the water in the water tank.

This configuration (i.e., vertical) has also been discovered to reduce the impact of any naturally occurring condensation on the burner. More specifically, unheated water entering the water heater 10 is sometimes at low temperatures (especially in Northern geographies) and brings about natural condensation of water on the internal components of the water heater. If such condensate forms or drips onto the body of the burner, the life of the burner may be compromised. It has been discovered that the vertical orientation of the burner 102 can help to reduce this problem.

Figure 13:
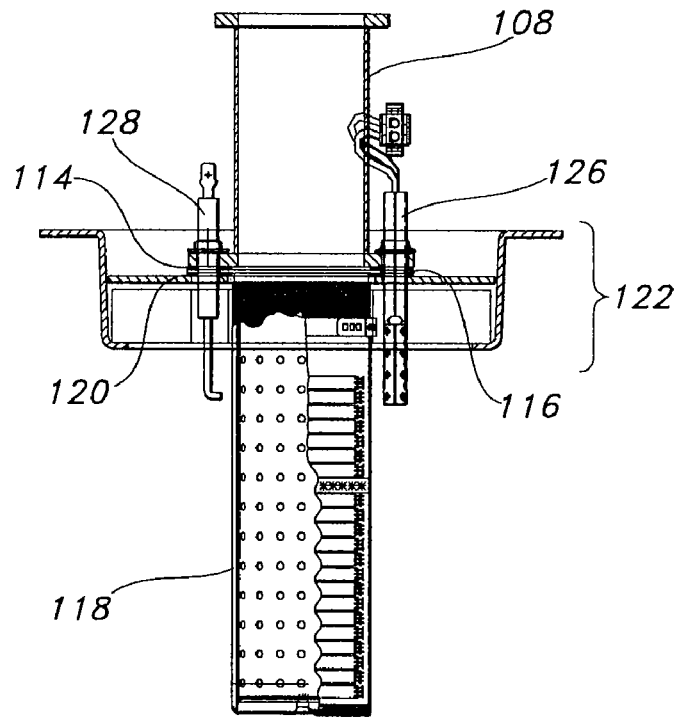
FIG. 13 is a cross-section side view of a subassembly of the blower and combustion assembly illustrated in FIG. 12.
Figure 14:
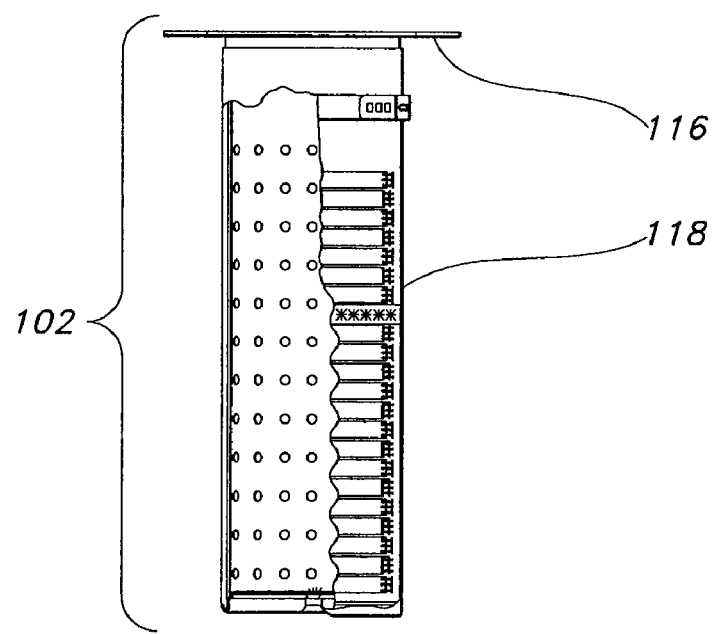
FIG. 14 is a cross-sectional side view of an exemplary embodiment of a burner according to aspects of this invention.

Referring now to FIG. 13, a cross-sectional side view of a subassembly of the burner mounting flange assembly 122, the burner transition tube 108, and the burner 102 is illustrated.

FIG. 13 shows the mating relationship between the burner transition tube 108, burner gaskets 114 and 120, upper flange 116 of the burner 102, and the burner mounting flange assembly 122. As indicated previously, FIG. 13 illustrates an exemplary orientation of igniter 126 and sensor 128 at opposite sides of the body 118 of the burner 102. A side view of the burner 102 is illustrated by itself in FIG. 14 for clarity.

Figure 15:
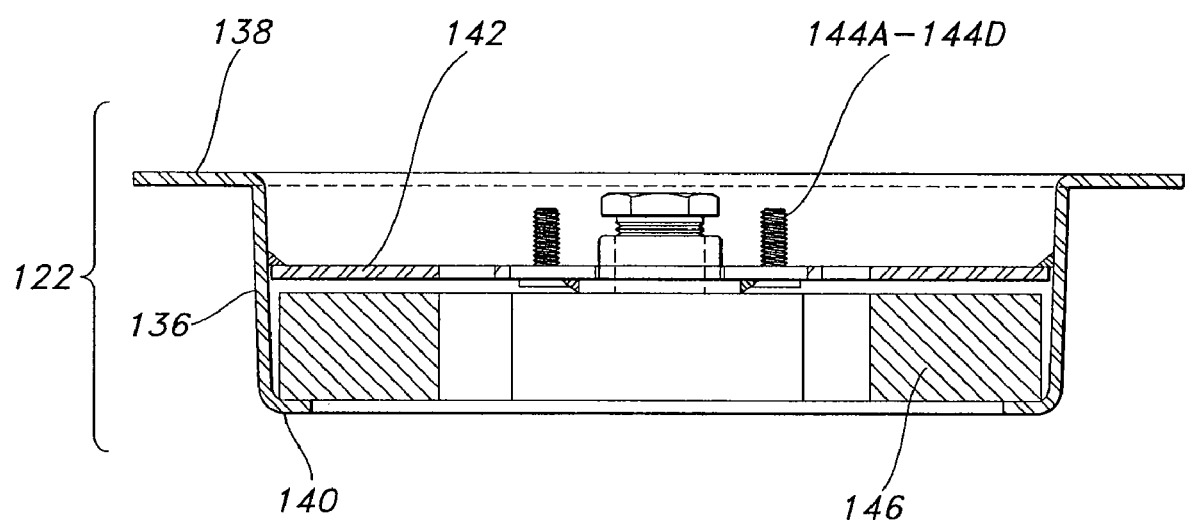
FIG. 15 is a cross-sectional side view of an exemplary embodiment of a burner mounting flange assembly according to aspects of this invention.

Referring now to FIG. 15, exemplary features of the burner mounting flange assembly 122 are illustrated. Burner mounting flange assembly 122 includes a flange body 136 having an outer lip 138 and an inner lip 140. Outer lip 138 includes mounting holes (not shown in this view) to facilitate mounting to an upper portion of the water tank. A burner mounting plate 142 is welded to an interior surface of the flange body 136 of the assembly 122. The burner mounting plate 142 includes four (4) mounting studs 144A-144D (only two are shown) for mounting the burner 102 to the burner mounting flange assembly 122. An insulation component 146 is captured between the inner lip 140 of the flange body 136 and the burner mounting plate 142 of the assembly 122. The insulation 146 can optionally be formed from the same material as the primary refractory 48 of the first pass collector assembly 28.

Figure 16:
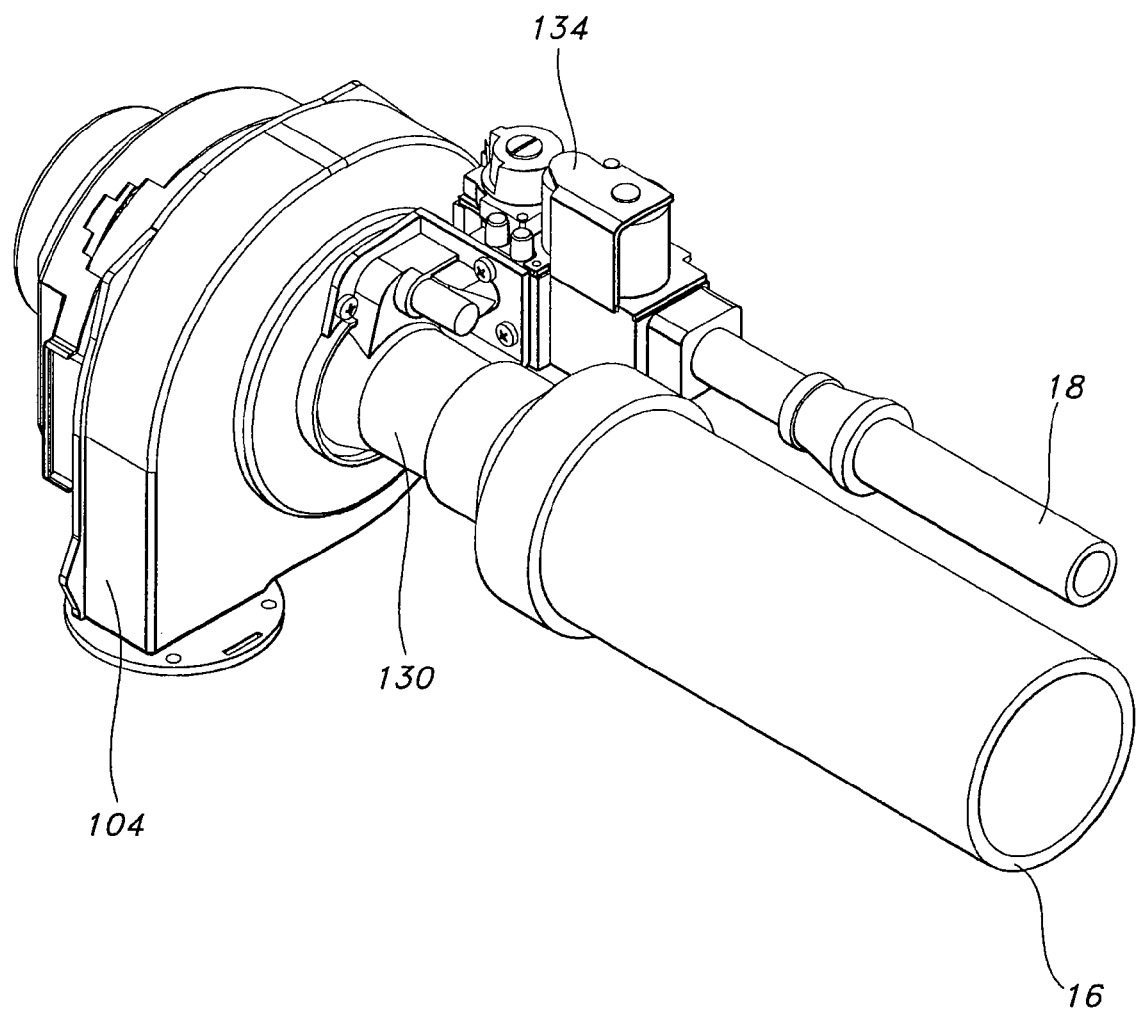
FIG. 16 is a perspective view of an exemplary embodiment of a blower assembly according to aspects of this invention.

Referring now to FIG. 16, an assembly of the blower 104 together with the air intake and gas mixer 130 and the gas valve 134 is illustrated. Air intake and gas mixer 130 may therefore act as a venturi. The combustion air inlet 16 and gas inlet 18 (both also shown in FIG. 1) are connected to the air intake 130 and gas valve 134, respectively. For example, the air inlet 16 may be a 3 inch PVC pipe, and the gas inlet 18 may be a ¾ inch pipe.

Figure 17:
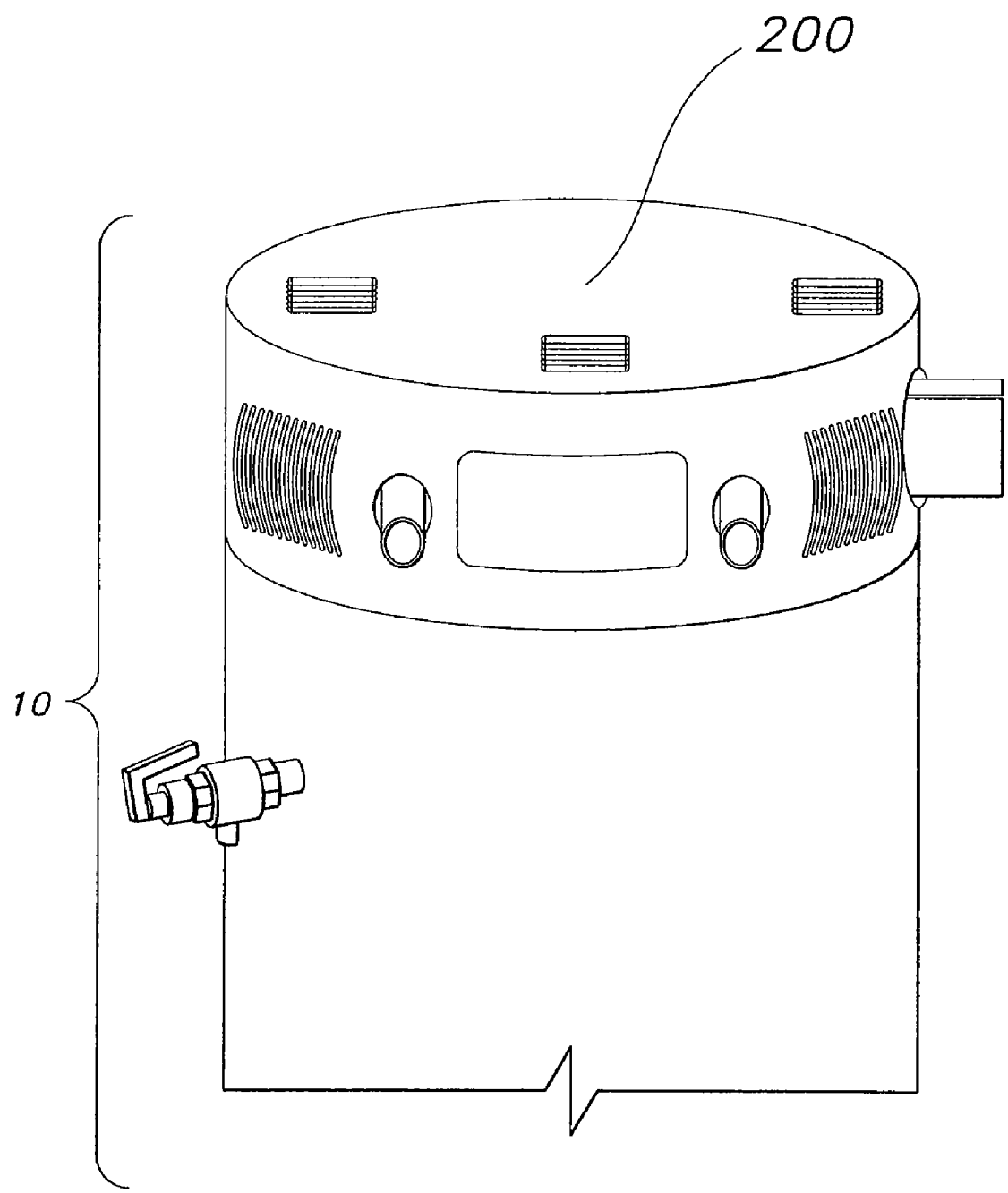
FIG. 17 is a perspective view of a top portion of the water heater illustrated in FIG. 1.
Figure 18:
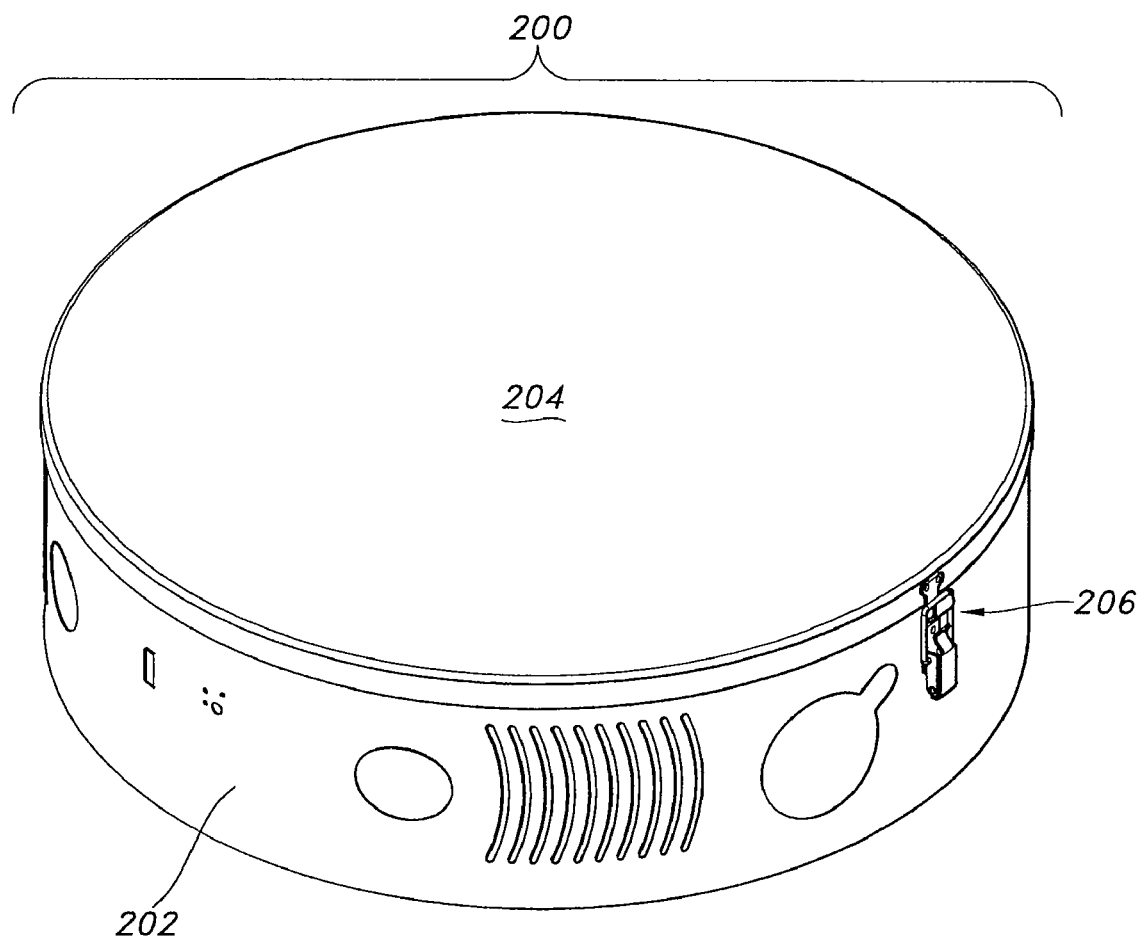
FIG. 18 is a perspective view of an exemplary embodiment of a head assembly according to aspects of this invention.
Figure 19:
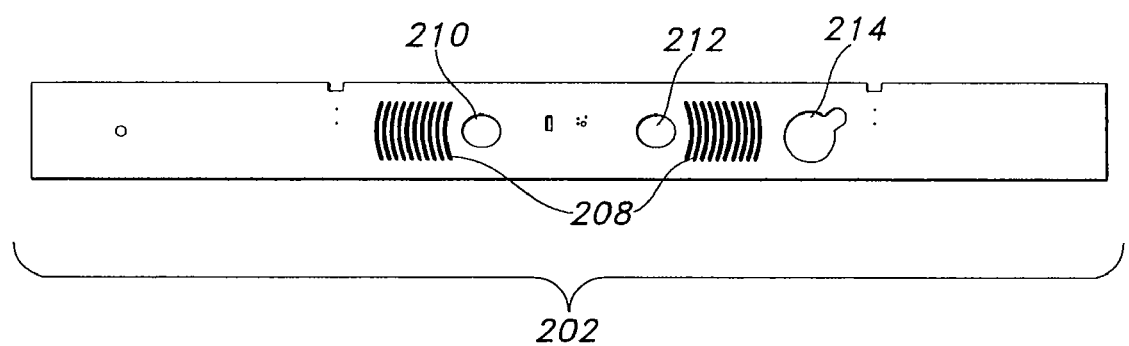
FIG. 19 is a front view of an exemplary embodiment of a combustion surround component of the head assembly illustrated in FIG. 18.

Referring now to FIGS. 17-19, exemplary aspects of the head assembly 200 of the commercial water heater 10 will now be described. As shown in FIG. 17, the head assembly 200 encapsulates the upper-most components of the water heater 10, including the blower and combustion assembly 100 and the second pass collector assembly 34. As shown in FIG. 18, the head assembly 200 includes a combustion surround 202, a head 204 that caps the combustion surround 202, and at least one latch 206 (optionally two or more latches 206) for engaging the head 204 to the combustion surround 202.

An exemplary embodiment of a combustion surround 202 is illustrated in FIG. 19. Among other ornamental features, the combustion surround 202 includes a series of vents in the form of "shark gills" 208. While vents in the head assembly 200 can take a wide variety of forms, shapes, and configurations, ornamental "shark gill" vents 208 have been selected to enhance the ornamental appearance of the head assembly 200. The particular shape and configuration of the "shark gill" vents 208 are non-functional. The shape and configuration are instead dictated by ornamental concerns.

The combustion surround 202 of the head assembly 200 also includes an opening 210 positioned to accommodate the heated water outlet 24 and an opening 212 positioned to accommodate the unheated water inlet 22. Finally, the combustion surround 202 includes an opening 214 positioned to accommodate the air inlet 16 and gas inlet 18.

EXAMPLES

A water heater corresponding to the exemplary embodiment illustrated in the figures was built and tested to determine its thermal efficiency. The water heater was tested in accordance with the American National Standard/CSA Standard for Gas Water Heaters (Volume III, Storage Water Heaters, With Input Ratings Above 75,000 Btu Per Hour, Circulating and Instantaneous). More specifically, three tests were conducted according to the method set forth in ANSI Standard No. Z21.10.3-2001 §2.9 ("Thermal Efficiency"). Thermal efficiency was computed according to the formula set forth in §2.9(j).

The results of the three tests, labeled Examples 1-3, are summarized in the following table:

|  | Example 1 | Example 2 | Example 3 |
| --- | --- | --- | --- |
| Thermal Efficiency (%) | 99.36% | 98.66% | 98.47% |
| Total Energy Used (Btu's) | 100,689.0 | 100,313.5 | 101,132.0 |
| Quantity of Water Withdrawn (lbs) | 1433.1 | 1407.1 | 1408.4 |
| Thermal ΔT (° F.): | 69.8 | 70.3 | 70.7 |
| Average Delivered Temperature (° F.) | 139.8 | 140.7 | 140.6 |
| Average Inlet Temperature (° F.) | 70.0 | 70.3 | 69.9 |
| Starting Outlet Temperature (° F.) | 139.8 | 140.0 | 140.5 |
| Ending Outlet Temperature (° F.) | 139.6 | 140.4 | 140.7 |
| Diameter of Orifice* (inch) | 1³⁄₁₆ | 1⅛ | 1³⁄₁₆ |

*Refers to orifice 68 of orifice plate 66 shown in FIG. 9

The tests conducted in Examples 1-3 revealed high thermal efficiencies of 99.36%, 98.66%, and 98.47%, respectively. The average thermal efficiency for the water heater was 98.83%, and the tests therefore justified a CSA certification of the water heater at 98.5% efficiency.

Although this invention has been described with reference to exemplary embodiments and variations thereof, it will be appreciated that additional variations and modifications can be made within the spirit and scope of this invention. Although this invention may be of particular benefit in the field of commercial water heaters, it will be appreciated that this invention can be beneficially applied in connection with residential or domestic water heaters and other heating systems as well.

What is claimed is:

1. An assembly for directing products of combustion between segments of a flue of a water heater, said assembly comprising:
    an insulator at least partially defining a chamber configured to direct products of combustion between the flue segments; and
    a cover configured to at least partially surround said insulator, said cover also being configured to be coupled to a water tank of the water heater;
    said insulator in an uncompressed state being dimensioned to extend outwardly from said cover when said insulator is positioned in said cover, and said insulator in a compressed state being dimensioned to permit coupling of said cover to the water tank.

2. The assembly of claim 1 wherein said insulator comprises a first insulator and a second insulator in contact with one another.

3. The assembly of claim 1 wherein said cover comprises a receptacle having a wall portion, said wall portion being configured to be coupled to the water tank when said insulator is in said compressed state.

4. The assembly of claim 3 wherein at least a part of said wall portion is welded to the water tank.

5. The assembly of claim 1 wherein said insulator is formed from a material including a high density insulation.

6. The assembly of claim 1 wherein said cover is formed from sheet metal.

7. The assembly of claim 1 wherein the water tank includes a bottom surface and said cover is configured to be coupled to said bottom surface of the water tank.

8. The assembly of claim 1 wherein said insulator has a wall portion configured to contact the water tank, said wall portion including a contour configured to decrease a surface area of contact between the insulator and the water tank.

9. A water heater comprising:
a water tank;
flue segments extending through said water tank; and
a collector assembly for directing products of combustion between said flue segments, said collector assembly including an insulator at least partially defining a chamber configured to direct products of combustion between said flue segments, and a cover configured to at least partially surround said insulator and being configured to be coupled to the water tank, said insulator in an uncompressed state being dimensioned to extend outwardly from said cover when said insulator is positioned in said cover, and said insulator in a compressed state being dimensioned to permit contact between said cover and the water tank.

10. The water heater of claim 9 wherein said cover comprises a receptacle having a wall portion, said wall portion being configured to be coupled to the water tank when said insulator is in said compressed state.

11. The water heater of claim 10 wherein at least a part of said wall portion is welded to the water tank.

12. The water heater of claim 9 wherein said insulator is formed from a material including a high density insulation.

13. The water heater of claim 9 wherein said cover is formed from sheet metal.

14. The water heater of claim 9 wherein the water tank includes a bottom surface and said cover is configured to be coupled to said bottom surface of the water tank.

15. The water heater of claim 9 wherein said insulator has a wall portion configured to contact the water tank, said wall portion including a contour configured to decrease a surface area of contact between the insulator and the water tank.

16. A method of providing an insulated passage for products of combustion between flue segments of a water heater, said method comprising the steps of:
(a) positioning an insulator in a cover such that a portion of the insulator extends out of the cover;
(b) compressing the extended portion of the insulator against a water tank of the water heater such that the cover is proximal to or touching the water tank; and
(c) coupling the cover to the water tank, thereby forming a sealed and insulated passage between the flue segments.

17. The method of claim 16 wherein said coupling step comprises welding the cover to the water tank.

18. The method of claim 16 wherein said coupling step further comprises welding a wall portion of the cover to the water tank.

19. The method of claim 16, said compressing step comprises compressing the extended portion of the insulator against a bottom surface of the water tank.

20. The method of claim 16, said coupling step comprises coupling the cover to a bottom surface of the water tank.

* * * * *